(12) United States Patent
Wallander

(10) Patent No.: US 10,457,462 B2
(45) Date of Patent: Oct. 29, 2019

(54) SNAP CLOSE PEEL RESEAL PACKAGE

(71) Applicant: BEMIS COMPANY, INC., Neenah, WI (US)

(72) Inventor: Aaron J. Wallander, Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 170 days.

(21) Appl. No.: 15/517,442

(22) PCT Filed: Oct. 10, 2014

(86) PCT No.: PCT/US2014/060091
§ 371 (c)(1),
(2) Date: Apr. 6, 2017

(87) PCT Pub. No.: WO2016/057046
PCT Pub. Date: Apr. 14, 2016

(65) Prior Publication Data
US 2017/0253406 A1  Sep. 7, 2017

(51) Int. Cl.
B65D 77/20 (2006.01)
B65D 1/34 (2006.01)
B29L 31/00 (2006.01)

(52) U.S. Cl.
CPC .......... B65D 77/2092 (2013.01); B65D 1/34 (2013.01); B65D 77/208 (2013.01);
(Continued)

(58) Field of Classification Search
CPC .......... B65D 77/2092; B65D 77/2084; B65D 77/2048; B65D 77/208; B65D 77/2088;
(Continued)

(56) References Cited

U.S. PATENT DOCUMENTS 3,398,876 A  8/1968 Ward
3,398,877 A  8/1968 Jacobson
(Continued)

FOREIGN PATENT DOCUMENTS

CH    482584 A    12/1969
EP   1652791 A1    5/2006
(Continued)

OTHER PUBLICATIONS

Burfield, Tom, "Safety First", Produce Ops (Apr. 10, 2014), 2 pages. Originally retrieved online Jun. 18, 2014, at http://www.denhamplastics.com/documents/produceops.pdf.
(Continued)

*Primary Examiner* — James N Smalley

(57) ABSTRACT

A package for the storage of food or other suitable products includes a tray and, optionally, a lidding film. The tray is thermoformed, molded, or otherwise shaped to provide a recessed portion and flange, the recessed portion defining a product-receiving cavity. The flange includes a frame portion surrounding the cavity and a margin portion disposed alongside the frame portion and, in some embodiments, extending substantially a full width of the tray. The optional lidding film attaches to both the frame and margin portions and typically seals the cavity. The margin portion and a side wall of the recessed portion may include locking features to allow the margin portion to snap close against the side wall. The package may then be made to stand on end with the margin portion acting as a base. The lidding film may include a peelable/sealable film to allow repeated access to the product while sealing the cavity between uses.

15 Claims, 14 Drawing Sheets

(52) U.S. Cl.
CPC ..... *B65D 77/2048* (2013.01); *B65D 77/2084* (2013.01); *B65D 77/2088* (2013.01); *B29L 2031/712* (2013.01); *B65D 77/204* (2013.01); *B65D 77/2024* (2013.01); *B65D 77/2028* (2013.01); *B65D 77/2032* (2013.01); *B65D 77/2044* (2013.01); *B65D 77/2068* (2013.01); *B65D 77/2072* (2013.01); *B65D 77/2076* (2013.01); *B65D 2203/12* (2013.01); *B65D 2207/00* (2013.01); *B65D 2577/2075* (2013.01); *B65D 2577/2083* (2013.01)

(58) Field of Classification Search
CPC .. B65D 1/34; B65D 77/2044; B65D 77/2024; B65D 77/2076; B65D 77/204; B65D 77/2072; B65D 77/2068; B65D 2577/2075; B65D 77/2028; B65D 2203/12; B65D 2207/00; B65D 2577/2083; B65D 77/2032; B29L 2031/712
See application file for complete search history.

(56) References Cited

U.S. PATENT DOCUMENTS

| | | | |
|---|---|---|---|
| 3,438,483 A | 4/1969 | Miller et al. | |
| 3,454,210 A * | 7/1969 | Spiegel | B65D 75/30 229/123.1 |
| 3,495,759 A | 2/1970 | Bergstrom et al. | |
| 3,676,159 A | 7/1972 | Fallowfield | |
| 3,786,982 A | 1/1974 | Rakes et al. | |
| 4,512,474 A | 4/1985 | Harding | |
| 4,679,701 A | 7/1987 | Ackermann et al. | |
| 4,735,335 A * | 4/1988 | Torterotot | B32B 15/08 220/260 |
| 4,784,268 A | 11/1988 | Perchak | |
| 4,850,504 A | 7/1989 | Gindrod et al. | |
| 4,880,112 A | 11/1989 | Conrad | |
| 4,955,530 A | 9/1990 | Rigby et al. | |
| 5,037,138 A | 8/1991 | McClintock et al. | |
| 5,470,156 A | 11/1995 | May | |
| RE37,171 E | 5/2001 | Busche et al. | |
| 6,691,886 B1 | 2/2004 | Berndt et al. | |
| 6,910,584 B2 | 6/2005 | Newth | |
| 7,172,779 B2 | 2/2007 | Castellanos et al. | |
| D606,392 S | 12/2009 | Prevost | |
| 7,927,679 B2 | 4/2011 | Cruz et al. | |
| 7,931,148 B2 | 4/2011 | Hansen et al. | |
| 8,256,636 B2 | 9/2012 | Huffer | |
| 8,283,010 B2 | 10/2012 | Cruz et al. | |
| 8,283,011 B2 | 10/2012 | Cruz et al. | |
| 8,616,373 B2 | 12/2013 | Hansen et al. | |
| 8,684,217 B2 | 4/2014 | Bruehl et al. | |
| 8,746,490 B2 | 6/2014 | Huffer et al. | |
| 2004/0154948 A1 | 8/2004 | Fux | |
| 2006/0172131 A1 | 8/2006 | Haedt et al. | |
| 2006/0269707 A1 | 11/2006 | Berbert | |
| 2007/0082161 A1 | 4/2007 | Cruz et al. | |
| 2009/0178945 A1 | 7/2009 | Moehlenbrock et al. | |
| 2010/0172604 A1 * | 7/2010 | Andersson | B65D 75/366 383/211 |
| 2011/0204054 A1 | 8/2011 | Huffer | |
| 2012/0055816 A1 | 3/2012 | Buchko | |
| 2012/0181280 A1 | 7/2012 | Barbier et al. | |
| 2013/0300028 A1 * | 11/2013 | Naber | B29C 45/006 264/242 |

FOREIGN PATENT DOCUMENTS

| | | |
|---|---|---|
| EP | 2774873 A1 | 9/2014 |
| FR | 2164868 A1 | 8/1973 |
| GB | 2408256 A | 5/2005 |

OTHER PUBLICATIONS

Forcino, Hallie, "Reclosable packaging options expand," The National Provisioner (May 13, 2014), 3 pages. Originally retrieved online Jun. 18, 2014, at http://www.provisioneronline.com/articles/100403-reclosable-packaging-options-expand.

Chapin, Carolyn, "The real seal," Food Processing (Jun. 4, 2010), 9 pages. Originally retrieved online Jun. 18, 2014, at http://www.foodprocessing.com.au/articles/39264-The-real-seal.

"Two lid packaging," Refrigerated & Frozen Foods (Jan. 6, 2014), 2 pages, Originally retrieved online Jun. 16, 2014, at http://www.refrigeratedfrozenfood.com/articles/87497-two-lid-packaging.

"New Re-Lock packaging", Faerch Plast A/S, 3 pages, Retrieved online Apr. 18, 2016 at http://faerchplast.com/en/news/new-re-lock-packaging.

"Re-lock packaging tray by Faerch Plast", FoodBev Media, 1 page, Retrieved online Apr. 18, 2016 at http://www.foodbev.com/news/re-lock-packaging-tray-by-faerch-plast/.

"Re-lock trays target chilled food and snacks market", Food & Drink Business Europe, 1 page. Retrieved online Apr. 18, 2016 at http://www.fdbusiness.com/re-look-trays-target-chilled-food-and-snacks-market/.

Communication from Christine E. Parsons to USPTO dated Sep. 21, 2017.

* cited by examiner

SNAP CLOSE PEEL RESEAL PACKAGE

FIELD OF THE INVENTION

The invention relates generally to packaging containers, e.g. for food packaging or for the packaging or storage of other suitable products. The invention is particularly applicable to such containers that include a molded or shaped tray defining a cavity that is sealed by a peelable film.

BACKGROUND

Many different types of packaging containers are known. Some have a two-piece construction, in which a molded base or tray has a recessed portion defining a product-receiving cavity and a lidding film attaches to the tray to cover the cavity and seal the contents of the tray. Such containers are commonly seen in restaurants and cafes to hold unit servings of food products such as jelly, honey, and butter. The lidding film seals to a flange portion of the tray that surrounds the cavity. To facilitate initially separating the lidding film from the tray, the tray is scored at one corner of the flange to define a small frangible corner piece. When opening the package, the user grasps the corner piece and the portion of the lidding film attached to it, and breaks the corner piece off of the remainder of the tray. The user then peels the lidding film apart from the flange with a smooth pulling motion while still grasping the small corner piece and the corresponding corner of the lidding film. During this procedure the lidding film appears to remain intact with no rips or tears, and the small corner piece of the tray remains attached to the lidding film.

SUMMARY

We have developed a family of packages that may be used to store food or other suitable products. The new packages include a tray and, optionally in some embodiments, a lidding film. The tray is thermoformed, molded, or otherwise shaped to provide a recessed portion and flange, the recessed portion defining a product-receiving cavity. Beyond this, the packages provide new and useful features, and combinations of features, that distinguish them from existing packages. For example, the flange includes a frame portion and a margin portion that is disposed alongside the frame portion. A line of transition between the margin portion and the frame portion may in some cases be a line of weakness, wherein portion(s) of the flange still frangibly connect(s) the margin portion to the frame portion, and in other cases a line of separation, wherein the margin portion and frame portion are not joined together. The frame portion surrounds the product-receiving cavity. In some cases, the margin portion extends substantially a full width of the tray. The optional lidding film attaches to both the frame portion and the margin portion and typically seals the cavity. The margin portion and a side wall of the recessed portion may include locking features formed therein to allow the margin portion to snap close against the side wall or to otherwise engage the side wall, e.g. with a friction fit that can hold the two members securely in place while also allowing them to be pulled apart with minimal force. If desired, the package may be designed to stand on end with the margin portion acting as a base. In a different orientation of the package, the margin portion may provide a side label when the lidding film is printed with suitable printed indicia and the margin portion is engaged against the side wall. Indicia on a portion of the lidding film associated with the margin portion may provide the side label, and indicia on another portion of the lidding film associated with the frame portion of the flange may provide a top label. In some cases, the lidding film is both peelable and resealable to allow repeated access to the product while sealing the cavity between uses.

We therefore describe herein, among other things, packages that include a tray and a lidding film. The tray has a recessed portion and a flange, the recessed portion defining a product-receiving cavity and the flange including two opposed edges defining a width of the tray. The lidding film extends across the cavity. The flange includes a margin portion and a frame portion, the frame portion surrounding the cavity and the margin portion being disposed alongside the frame portion and extending substantially the width of the tray. The lidding film attaches to both the frame portion and the margin portion of the flange.

The margin portion may frangibly connect to the frame portion, or it may be separated from the frame portion and held in place alongside the frame portion by the lidding film. The lidding film may attach to the frame portion along a closed path to seal the cavity. Attachment of the lidding film to the margin portion may be characterized by a non-peelable seal, and attachment of the lidding film to at least part of the frame portion may be characterized by a peelable seal. The frame portion may include first and second end members that are connected to each other by first and second side members, the first end member being adjacent the margin portion and the at least part of the frame portion characterized by the peelable seal including the first end member and the first and second side members. The lidding film may be or include a peelable/resealable film. The peelable/resealable film may be (a) resistant to delamination at attachment to the margin portion and (b) susceptible to delamination at attachment to the at least part of the frame portion. The lidding film may be or include a laminate that includes a first polymer film, a second polymer film, and an adhesive layer between the first and second polymer films, the laminate being configured to delaminate at the adhesive layer. The adhesive layer may include an adhesive and may be pattern-applied such that in patterned areas of the adhesive layer the first and second polymer films are separated by the adhesive and in unpatterned areas of the adhesive layer the first and second polymer films bond to each other without the adhesive therebetween. The first and second polymer films may be configured to delaminate from each other in the patterned areas. Alternatively, the adhesive layer may be unpatterned.

The tray may be or include a thermoformed thermoplastic sheet. The margin portion may have a margin width, and a ratio of the margin width to the width of the tray may be in a range from 0.8 to 1.2. Attachment of the lidding film to the margin portion and to the frame portion may be such that, as a user opens the package, the margin portion remains attached to the lidding film along the margin width to avoid transverse curling of the lidding film as the lidding film is separated from the frame portion. The recessed portion may include a side wall having a first imperforate locking feature, and the margin portion may include a second imperforate locking feature configured to mate with the first imperforate locking feature by pivotably rotating the margin portion towards the side wall. The package may be configured such that, when the first and second locking features are mated together, the margin portion functions as a base upon which the package can stand upright on a level surface. The lidding film may have a first film region covering the cavity and the frame portion of the flange and a second film region covering the margin portion of the flange, and the lidding film may have indicia printed thereon, the indicia including a first indicia image in the first film region and a different second indicia image in the second film region. When the first and second locking features are mated together, the lidding film may be folded such that, from a top view of the package the first indicia image is visible and from a side view of the package the second indicia image is visible. From the top view of the package, the second indicia image may not be substantially visible, and from the side view of the package, the first indicia image may not be substantially visible. The margin portion may frangibly connect to the frame portion by a line of weakness, and the tray may be adapted to break along the line of weakness to separate the margin portion from the frame portion while the lidding film is adapted to bend along the line of weakness but remain intact and attached to both the margin portion and the frame portion.

We also disclose resealable packages that include a tray and a lidding film. The tray has a recessed portion and a flange, the recessed portion defining a product-receiving cavity and the flange including a frame portion and a margin portion, the frame portion surrounding the cavity, the frame portion including first and second end members and first and second side members that connect the first and second end members to each other, the margin portion being adjacent to and distinct from the first end member. The lidding film attaches to the first and second end members and to the first and second side members to seal the cavity; the lidding film also attaches to the margin portion. Attachment of the lidding film to the margin portion is characterized by a non-peelable seal, and attachment of the lidding film to at least the first end member and the first and second side members is characterized by a peelable seal.

The lidding film may be or include a peelable/resealable film that is (a) resistant to delamination at attachment to the margin portion and (b) susceptible to delamination at attachment to the first end member, the first side member, and the second side member. The lidding film may be or include a laminate that includes a first polymer film, a second polymer film, and an adhesive layer between the first and second polymer films, the adhesive layer including an adhesive and being pattern-applied such that in patterned areas of the adhesive layer the first and second polymer films are separated by the adhesive and in unpatterned areas of the adhesive layer the first and second polymer films bond to each other without the adhesive therebetween. The first and second polymer films may be configured to delaminate from each other in the patterned areas of the adhesive layer. Attachment of the lidding film to the second end member may be characterized by a non-peelable seal. The flange may include two opposed edges defining a width of the tray, and the margin portion may extend substantially the width of the tray. The recessed portion may include a side wall having a first imperforate locking feature, and the margin portion may include a second imperforate locking feature configured to mate with the first imperforate locking feature by pivotably rotating the margin portion towards the side wall. The package may be configured such that, when the first and second locking features are mated together, the margin portion functions as a base upon which the package can stand upright on a level surface. The lidding film may have a first film region covering the cavity and the frame portion of the flange and a second film region covering the margin portion of the flange, and the lidding film may have indicia printed thereon, the indicia including a first indicia image in the first film region and a different second indicia image in the second film region. When the first and second locking features are mated together, the lidding film may be folded such that, from a top view of the package the first indicia image is visible and from a side view of the package the second indicia image is visible. From the top view of the package, the second indicia image may not be substantially visible, and from the side view of the package, the first indicia image may not be substantially visible. The margin portion may frangibly connect to the first end member of the frame portion by a line of weakness, and the tray may be adapted to break along the line of weakness to separate the margin portion from the frame portion while the lidding film is adapted to bend along the line of weakness but remain intact and attached to the margin portion as well as to the first end member, the second end member, the first side member, and the second side member of the frame portion.

We also disclose thermoplastic sheets suitable for use as components of packages to hold a product or products, the thermoplastic sheet being contoured to form a tray. The tray includes a recessed portion and a flange, the recessed portion defining a product-receiving cavity and the flange including a frame portion and a margin portion, the frame portion surrounding the cavity and including first and second end members and first and second side members that connect the first and second end members to each other, the margin portion being disposed alongside the first end member with a line of transition therebetween. The recessed portion includes a side wall adjacent the first end member and having a first imperforate locking feature formed therein. The margin portion has a second imperforate locking feature formed therein, the second imperforate locking feature configured to mate with the first imperforate locking feature by pivotably rotating the margin portion about the line of transition towards the side wall.

The flange may define a width of the tray, and the margin portion may extend substantially the width of the tray. The margin portion may have a margin width, and a ratio of the margin width to the width of the tray may be in a range from 0.8 to 1.2. The tray may be configured such that, when the first and second locking features are mated together, the margin portion functions as a base upon which the tray can stand upright on a level surface. The line of transition may be a line of separation. Alternatively, the line of transition may be a line of weakness that frangibly connects the first end member to the margin portion, and the tray may be adapted to break along the line of weakness to separate the margin portion from the first end member. The tray may be one of a plurality of trays formed in the sheet. The plurality of trays may be arranged in rows including a first and second row adjacent to each other, and the trays in the first row may be oriented in a first direction and the trays in the second row may be oriented in a second direction opposite the first direction. The plurality of trays may be defined by longitudinal cut lines and transverse cut lines in the sheet, the longitudinal cut lines including a first longitudinal cut line and the transverse cut lines including a first transverse cut line and a second transverse cut line, the trays including a first and second adjacent tray that are each bounded by the first longitudinal cut line, the first transverse cut line, and the second transverse cut line, and the line of transition for the first tray may not be in registration with the line of transition for the second tray. The first and second adjacent trays may be oriented in opposed directions.

We also disclose packages that include such a thermoplastic sheet and a lidding film extending across the cavity and attached to both the frame portion and the margin portion of the flange. The lidding film may be or include a peelable film. The lidding film may be or include a peelable/resealable film. The lidding film may be or include a laminate that includes a first polymer film, a second polymer film, and an adhesive layer between the first and second polymer films, the laminate being configured to delaminate at the adhesive layer.

Related articles, systems, and methods can also be found in the appended claims and/or in the detailed description that follows.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and where.

DETAILED DESCRIPTION

As summarized above, we have developed a new family of packages in which a cavity in a molded or otherwise shaped tray is sealed by a lidding film (which is optional in some embodiments), and a margin portion of the tray, which may be attached to a remainder of the tray by a line of weakness or may be separated from the reminder of the tray by a line of separation, remains attached to the lidding film when the lidding film is removed by a user who wishes to access the contents of the cavity. The lidding film is typically peelable. In some cases the lidding film is also resealable to allow for partial consumption or use of the cavity contents and repeated resealing of any contents that remain in the cavity. In some embodiments, the frangible margin portion has a width that is the same as or similar to a width of the tray, e.g., within 10 or 20% thereof. Locking features may also be provided on the margin portion and a side wall of the tray to allow the margin portion to snap close against, or otherwise engage, the side wall, e.g. with a friction fit that can be released by hand manipulation. When engaged against the side wall, the margin portion may be designed to function as a base upon which the package may stand on end on a level surface. Also, indicia on a portion of the lidding film attached to the margin portion may serve as a side label, and indicia on a different portion of the lidding film, covering the cavity, may serve as a top label.

Figure 1A:
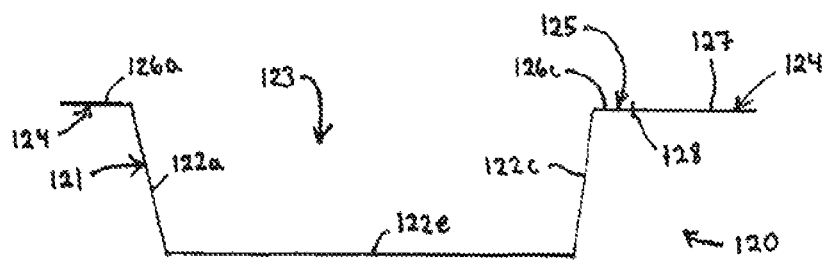
FIG. 1A is a schematic side or sectional view of a tray.

Turning then to FIG. 1A, we see there a tray 120 that may form part of a suitable package. The tray 120 has a recessed portion 121 and a flange 124. The recessed portion 121 defines an open cavity 123, which is sized and shaped to hold a product such as cheese, meat, or other food or non-food products. The product and its size or quantity may be such that it can be consumed or used by the end user incrementally, e.g. the end user may take or use some of the product and leave the remainder of the product in the cavity for future use. Thus, even though the cavity 123 may have any desired volume, the volume may be larger than the volume associated with an individual unit or serving of the product. For example, for many types of products, the volume of the cavity 123 (when covered) may typically be at least 50 $cm^3$, or at least 100 $cm^3$, or at least 200 $cm^3$, or in a range from 50-1000 $cm^3$, or in a range from 100-500 $cm^3$, or in a range from 200-300 $cm^3$. Other volumes may however also be used. The recessed portion 121 includes side walls 122a and 122c, as well as a bottom wall or floor 122e. In cases where the tray 120 is provided with its 3-dimensional shape or contour by a thermoforming process using a mold, the side walls 122a, 122c, as well as other side walls of the recessed portion 121 not visible in this FIG. 1A, may be tapered at a slight angle rather than being perpendicular to the floor 122e and/or flange 124 to facilitate removal of the tray 120 from the mold.

The flange 124 of the tray 120 is divided by a line of transition 128 into two parts: a frame portion 125 and a margin portion 127. (In some embodiments, not depicted, the tray may have a second margin portion opposite the margin portion 127.) The frame portion 125 frames or surrounds the cavity 123 and includes end members 126a, 126c and side members (not shown in FIG. 1A) that connect the end members to each other. In some cases, the line of transition 128 is a line of weakness, in which case the margin portion 127 remains at least partially attached to the frame portion 125 of the flange 124, and the margin portion 127 is frangible, i.e., adapted to crack, tear, or otherwise break away from the frame portion 125, and in particular from the end member 126c of the frame portion 125, by the line of weakness. The line of weakness in such cases may be any structure or feature that facilitates such breakage, such as a notch, groove, or other feature of reduced thickness extending along the line 128, or a series of holes, perforations, slots, or slits in the flange 124 along the line 128, but a portion or portions of the flange 124 remain in place to join the margin portion 127 to the frame portion 125. In other cases the line of transition 128 may be a line of separation rather than a line of weakness. In such cases, the margin portion 127 is substantially entirely detached from the frame portion 125, but is typically held in place alongside an edge of the frame portion 125 e.g. by a lidding film, discussed below. A line of separation may be made by sawing, cutting, melting, or otherwise forming a continuous slot in the flange 124 substantially entirely between the margin portion and the frame portion. Alternatively, the line of separation may be the remnant of what was originally a line of weakness, e.g. the structure that remains after breaking a frangible margin portion away from the frame portion. In the side view of FIG. 1A, the line of transition 128 is represented schematically by a short vertical line.

The tray 120 may be made of any suitable material. In some embodiments, the material of the tray 120 is selected so that the tray is physically rigid or at least semi-rigid. The tray 120 may, for example, be sufficiently rigid that it is self-supporting, i.e., that the tray substantially retains its 3-dimensional shape under the influence of its own weight when placed on a flat tabletop. In some embodiments, the tray 120 is made of a thermoplastic sheet of one or more polymer materials, and the sheet may have a single layer construction or a multilayered construction. The tray 120 may for example be comprised of materials or a blend of materials selected from materials conventionally used in thermoforming, such as polyvinyl chloride, polyester, copolyester, high impact polystyrene, polystyrene, polypropylene, copolymers of polypropylene, high density polyethylene, polybutylene terephthalate, styrene-butadiene copolymers, polyacrylonitrile copolymers, polycarbonate, polymethylmethacrylate, and blends or composites of the foregoing materials, including blends with other various polymeric, organic, or inorganic materials as are known to those of ordinary skill in the art. Other materials that may be included in the composition of the tray 120 include materials selected from the family of sealant materials such as polyolefins including polyethylene, copolymers of polyethylene, such as ethylene vinyl acetate, and sealants based on coating technology such as polyvinylidene chloride and copolymers of polyvinylidene chloride, waxes, acrylics, and a wide variety of other materials known to those of ordinary skill in the art. Of course, in the case of food applications, the tray 120 is composed of materials that have been approved for or are generally accepted for use with food products.

Figure 1B:
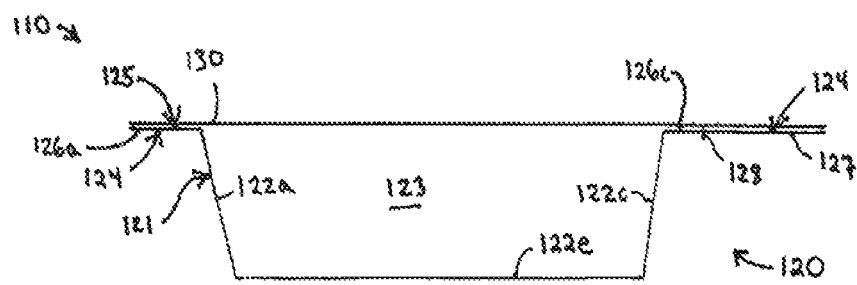
FIG. 1B is a schematic side or sectional view of a package that includes the tray of FIG. 1A and a lidding film attached thereto.

In FIG. 1B, the tray 120 is shown together with a lidding film 130 or other suitable film or cover to provide an enclosed package 110. The lidding film 130 extends across and covers the cavity 123 so that the cavity 123 is closed or substantially closed. Before the lidding film 130 is applied to the tray 120, a suitable product (not shown) as discussed above is loaded into the cavity 123. The lidding film 130 is then applied to and attached to the tray 120. The lidding film 130 attaches to the tray 120, in particular to the flange 124 of the tray, to keep the product confined within the cavity 123 until a user is ready to open the package 110. The lidding film 130 attaches to both the frame portion 125 and the margin portion 127 of the flange 124. Attachment of the lidding film 130 to the frame portion 125 typically occurs along a closed path (see e.g. item 214 in FIG. 2) that encircles the cavity 123 so the lidding film 130 seals the cavity 123 and seals the product in the cavity 123 in an airtight, watertight, and/or hermetic fashion. Attachment or sealing of the lidding film 130 to the various portions of the flange 124 may be by any suitable means, including by a suitable heat sealing operation or by one or more adhesive layers or other suitable bonding materials or means interposed between the lidding film 130 and the flange 124. In a heat sealing operation, a fusion bond is formed between the lidding film 130 and the pertinent portions of the flange 124 by bringing such bodies into direct contact and providing conventional indirect heating to the areas of contact. The conventional indirect heating generates sufficient heat on at least one film contact surface for conduction to the contiguous film contact surface such that the formation of a bond interface therebetween is achieved without loss of the film integrity.

The lidding film 130 may be made of a material that is relatively flexible, e.g., more flexible than the material of the tray 120. The lidding film may also be peelable, i.e., after attachment to the tray 120, the lidding film is able to be peeled apart from at least selected portions of the tray 120 with no ripping or tearing of the type that would prevent the film 130 from being able to completely cover the cavity 123 again. The lidding film 130 may, for example, be or include any suitable peelable lidding film known in the art, such as a monolayer film or a multilayer film. Depending on the intended application, any of the films in the family of EZ Peel™ lidding films sold by Bemis Company, Inc. (Neenah, Wis.) may be used.

For example, the lidding film 130 may be or include a thermoplastic film having a film structure comprising at least a first polymer layer that includes an ethylene/unsaturated ester copolymer, the first polymer layer being an exterior film layer which is free of both polybutylene and an ionomer resin. The ethylene/unsaturated ester copolymer may comprise any ethylene/unsaturated ester copolymer or derivative thereof, such as a material selected from the group consisting of ethylene/methyl acrylate copolymer, ethylene/methyl methacrylate copolymer, ethylene/ethyl acrylate copolymer, ethylene/ethyl methacrylate copolymer, ethylene/butyl acrylate copolymer, ethylene/2-ethylhexyl methacrylate copolymer, ethylene/vinyl acetate copolymer, and blends thereof, and more particularly an ethylene/vinyl acetate copolymer or blends thereof. The first polymer layer may include a first surface and an opposing second surface, the first surface having a surface tension in a range from 36 to 60 dynes/cm, or from 40 to 56 dynes/cm, as measured in accordance with ASTM D-2578-84 Test Method. Such a thermoplastic film may be adapted to form a peelable seal between the first surface of such first polymer layer and a polyester substrate (e.g. the tray 120), for example, by a pressure of less than 1×10⁵ Pa applied therebetween. The peelable seal may exhibit a peel strength in a range from 0.5 to 9 pound-force per linear inch (0.09 to 4.1 kilogram-force per linear centimeter). The peel strength may be measured in accordance with ASTM F-904 Test Method or in accordance with a modification of this test method. (The modification involves preparing test specimens by heat-sealing the surface of the subject film along its entire length to a second thermoplastic film with an end portion of the subject film unsealed to the second film. With the test specimens prepared in this manner, the unsealed end portion of the subject film is then peeled from the second film at an angle of 180 degrees relative to the second film.) Further non-limiting examples of peelable lidding films suitable for use as the lidding film 130 are described in patent application publication US 2006/0269707 (Berbert) and U.S. Reissue Pat. RE 37,171 (Busche et al.). In the case of food applications, the lidding film 130 is composed of materials that have been approved for or are generally accepted for use with food products.

The lidding film 130 may also be or comprise a peelable/resealable film, i.e., a film that is both peelable and resealable. In this regard, a multilayer lidding film may be considered resealable when the bond between two layer surfaces forms an interface adapted to reseal after initial separation of such surfaces by peeling. A resealable bond may also be a bond between two layer surfaces that, after such surfaces have been initially separated by peeling, the surfaces can be joined together by the application of hand pressure to form a seal. Generally, the force required to "reseal" the interface is proportional to the manual pressure exerted on the film. Accordingly, the peelable resealable interface of certain lidding films may include a first (initial) interfacial peel strength "A" and a second (subsequent) interfacial peel strength "B". Nonlimiting examples of suitable peelable/resealable multilayer films are described in patent application publications US 2006/0172131 (Haedt et al.) and US 2007/0082161 (Cruz et al.). The bond formed between two interior layers of a peelable/resealable multilayer film having the first interfacial peel strength "A" and the second interfacial peel strength "B" is adapted to remain secure and unbroken during package fabrication, distribution, and storage and yet may be easily and repeatedly separated and rejoined, e.g. by the end user when initially opening and later accessing the stored product. Accordingly, the pertinent peelable resealable interface within the multilayer film has a first interfacial peel strength, A, when the lidding film 130 is initially peeled away from the tray 120 after being heat sealed thereto, and A may be equal to or less than 4.1 kilogram-force per linear inch (40.2 Newton per linear inch) as measured in accordance with ASTM F-904-98 test method. The second interfacial peel strength, B, may be at least 0.330 kilogram-force per linear inch (3.2 Newton per linear inch), or at least 0.400 kilogram-force per linear inch (3.9 Newton per linear inch) as measured in accordance with ASTM F-904-98 test method where the films under test are peeled apart and re-adhered to each other before the test. In many embodiments, A≥B.

Peelable/resealable functionality may be employed using multilayer films having at least a polymeric first layer, a polymeric second layer, and a third layer, where the polymeric first layer and the polymeric second layer each have a predetermined composition, and where the polymeric second layer is disposed to be in contact with the first and third layers. The polymeric first layer may be an innermost exterior-film layer which may include a first surface and an opposing second surface, and which may comprise a heat-sealable, water-insoluble polyester. The polymeric second layer may be an interior-film layer having a first surface and an opposing second surface which may comprise a pressure-sensitive adhesive. The polymeric first and second layers may be coextruded together so that the polymeric first layer is immediately adjacent to and in contact with the polymeric second layer. The bond between the polymeric first and second layers may be a peelable/resealable bond such that the polymeric first and second layers may be manually delaminated and re-adhered. The third layer may comprise any suitable material such as a thermoplastic, a cellulosic, a metallic material, or combinations thereof which may bond directly with the surface of the polymeric second layer. In some embodiments the third layer is also coextruded along with the polymeric first and second layers.

The heat-sealable, water-insoluble polyester of the polymeric first layer of such a peelable/resealable multilayer film may include homopolymers and copolymers of alkyl-aromatic esters, such as, for example, but not limited to, polyethylene terephthalate (PET), amorphous polyethylene terephthalate (APET), crystalline polyethylene terephthalate (CPET), glycol-modified polyethylene terephthalate (PETG), and polybutylene terephthalate; copolymers of terephthalate and isophthalate, such as, for example, but not limited to, polyethylene terephthalate/isophthalate copolymer; homopolymers and copolymers of aliphatic esters such as, for example, polylactic acid (PLA) and polyhydroxyalkonates, such as, for example, but not limited to, polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials.

The pressure sensitive adhesive or tacky adhesive of the polymeric second layer of such peelable/resealable multilayer films may comprise an elastomeric first component and a tackifier second component. The elastomeric first component may comprise styrene/rubber copolymers which may include, but are not limited to, polystyrene/butadiene/styrene (SBS), polystyrene/isoprene/styrene (SIS), polystyrene/ethylene-butylene/styrene (SEBS), and polystyrene/ethylenepropylene/styrene (SEPS), or blends of any of these materials. The tackifier second component may comprise any tackifier conventionally used with elastomers to form pressure sensitive adhesives. Suitable tackifiers include, but are not limited to, hydrocarbon tackifiers such as terpene resins, such as resins sold under the trademark Zonatac® by Arizona Chemical Company (Jacksonville, Fla.) and petroleum hydrocarbon resins, such as resins sold under the trademark Escorez™ by ExxonMobil Chemical Company (Houston, Tex.).

Figure 1C:
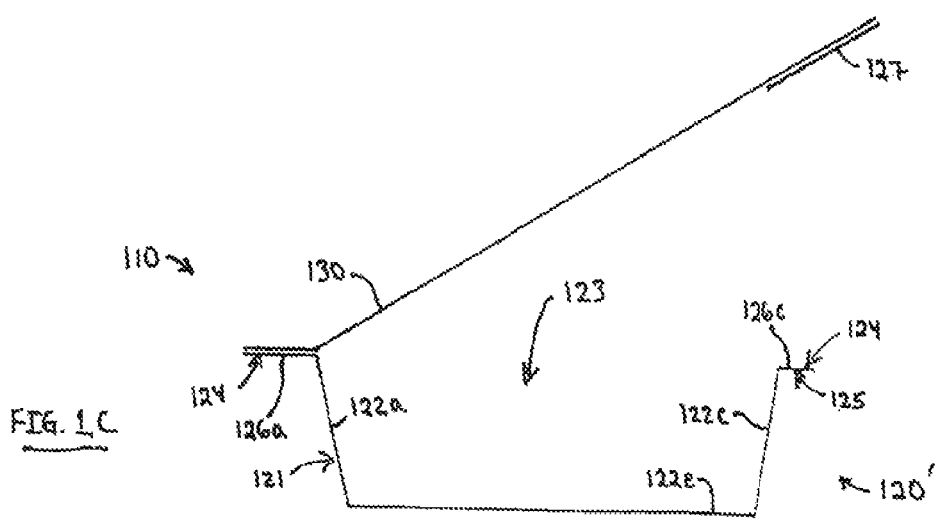
FIG. 1C is a schematic side or sectional view of the package of FIG. 1B with the lidding film in an open position.

Returning to our discussion of the figures, FIG. 1C shows the package 110 of FIG. 1B with the lidding film 130 in an open position, i.e., where the user has peeled the lidding film 130 apart from a portion of the tray 120 in order to access the product (not shown) disposed in the cavity 123. In taking this action, if the line of transition 128 (FIG. 1B) is a line of weakness, the user first breaks the margin portion 127 away from the remainder of the tray 120 along the line of weakness. Such a line of weakness, if present, may be designed so the user can break the margin portion 127 apart from the frame portion 125 (specifically, from the end member 126c) with ordinary hand manipulation, optionally facilitated by bending or flexing the margin portion 127 back and forth along the line of weakness. The lidding film 130 is sufficiently resilient and resistant to tearing so that it remains substantially intact as the margin portion 127 is being broken apart from the end member 126c. By "substantially intact", we allow for the fact that a lidding film 130 that includes or is a peelable/resealable multilayer film may exhibit tearing in one or some, but not all, of its individual layers, as discussed elsewhere herein, such that the lidding film may be made to completely cover the cavity 123 again if desired. In any case, the lidding film 130 remains attached to the margin portion 127 after complete detachment of the margin portion 127 from the frame portion of the tray 120. (By remaining attached to the lidding film 130, the margin portion 127, which is less flexible or more rigid than the lidding film, can be used as a tab or handle with which to manipulate the lidding film as discussed further below.) Initially, the lidding film 130 also remains attached to the frame portion 125 of the flange 124. However, as the user pulls the margin portion 127 away from the frame portion of the tray 120, the lidding film 130 peels away first from the end member 126c and then from the side members (not shown in FIG. 1C) that connect the end member 126c to the end member 126a, thus uncovering and exposing the contents of the cavity 123 as shown. In some cases, the lidding film 130 may also be peeled away from the end member 126a such that the lidding film 130 is completely separated from the tray 124, whereupon the lidding film and the attached margin portion 127 may be set aside or discarded.

As can be appreciated from FIGS. 1B and 1C, it may be desirable for attachment of the lidding film 130 to the tray 120 to be characterized by a peelable seal in some areas, and by a non-peelable seal in other areas. For example, to the extent it is desirable for the margin portion 127 to remain strongly attached to the lidding film 130, attachment in the area of the margin portion may be made to be non-peelable. On the other hand, since it is desirable for the lidding film to separate from at least the end member 126c and the side members of the frame portion 125, attachment in those areas may be made to be peelable. Peelable and non-peelable attachments may be distinguished from each other on the basis of peel strength. For example, the peel strength of a non-peelable seal may be greater than the peel strength of a peelable seal. We may also specify a suitable threshold—for example, in some applications, 2.0 kilogram-force per linear inch, or 2.5 kilogram-force per linear inch—at or above which the seal may be considered non-peelable and below which the seal may be considered peelable. For purposes of this application, a seal or attachment between the lidding film 130 and a given portion of the tray 120 may be considered peelable both in cases where the lidding film remains completely intact with no tearing as it is separated from the tray (e.g. where separation occurs along a surface that, prior to applying the lidding film to the tray, was an exterior surface of the lidding film), and in cases where one or more layers—but not all layers—of a multilayer lidding film tear such that the torn layer(s) remain attached to the tray while the remaining (intact) layer or layers of the multilayer lidding film separate from the tray and from the torn layer(s) of the lidding film.

Figure 2:
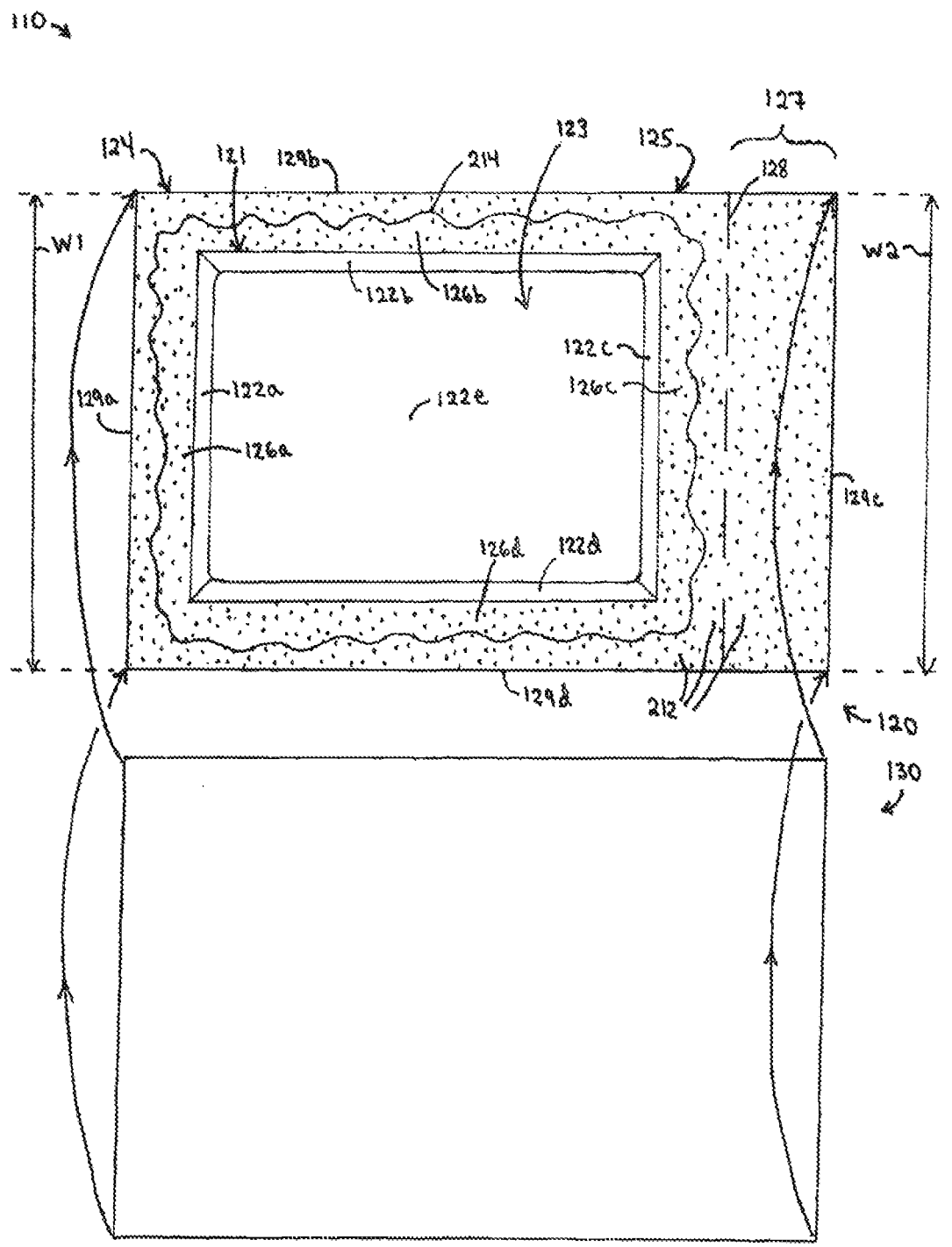
FIG. 2 is a schematic top view of the package of FIG. 1B, where the lidding film is shown separated from the tray for ease of illustration.

A better appreciation of examples of relative lengths and widths of the tray, lidding film, and package of FIGS. 1A-1C can be seen in the top view of FIG. 2. There, the package 110, tray 120, and lidding film 130 of FIG. 1B are shown, but the lidding film 130 is shown separated from the tray 120 for ease of illustration. In this figure, like reference numbers to those used in FIG. 1B designate like elements and need not be discussed further. The frame portion 125 can be seen to include not only the end members 126a, 126c, but also side members 126b, 126d that connect the end members to each other. The recessed portion 121 can similarly be seen to include not only side walls 122a, 122c, but also side walls 122b, 122d. A closed path 214 indicates schematically one of many possible closed paths along which the lidding film may attach or seal to the flange 124, or, more specifically, to the frame portion 125 of the flange 124, so as to seal the cavity 123 and isolate the contents (not shown) of the cavity from external influences. The upper exposed surfaces of the flange 124, including surfaces of both the frame portion 125 and the margin portion 127, are shown with shading 212 to represent the area of attachment of the lidding film 130 to the flange 124 and its component elements. The shading 212 may for example represent an area where the lidding film 130 is heat sealed to the tray 120, and/or it may represent an adhesive or other suitable bonding material interposed between the lidding film 130 and the flange 124.

The flange 124 is bounded by opposed outer edges 129a and 129c, and by opposed outer edges 129b and 129d. The edge 129c of the flange 124 is also an outer edge of the margin portion 127, since the margin portion 127 resides at a boundary or margin of the flange 124. In the depicted embodiment, the margin portion 127 has opposed outer edges along an orthogonal axis that coincide with terminal portions of the edges 129b, 129d. Due to this coincidence, the margin portion 127 has a width W2 which is equal to a width W1 of the tray 120. (The width W1 in this case is also equal to the width of the flange 124, and equal to the width of the frame portion 125.) In alternative embodiments, the flange 124 need not have a simple rectangular shape, such that one or both opposed outer edges of the margin portion are not necessarily collinear with corresponding outer edges of the frame portion 125. In such cases the width W2 of the margin portion 127 may differ somewhat from W1, which we may associate with the width of the tray 120 and/or the width of the frame portion 125. However, regardless of the shape of the flange, W2 may be substantially the same as W1 so that the margin portion 127 extends a significant fraction of the width of the tray and/or a significant fraction of the width of the frame portion. For example, the fraction W2/W1 may be in a range from 0.8 to 1.2, or from 0.9 to 1.1. In such embodiments, where the width W2 is equal to or close to W1, the margin portion 127 is physically long enough to function as a stabilizing handle for the end user to manipulate the lidding film with and to keep the lidding film from curling in a transverse direction (e.g. along an axis perpendicular to the plane of FIG. 1C) as the package is opened and closed. Throughout this document, the term "width" in connection with a dimension such as W1 or W2 between opposed outer edges of a given member should be construed broadly and not narrowly as contrasted with "length". Thus, for example, for a rectangle having sides or edges of length "a" and "b", where a>b, "a" may be said to be a width of the rectangle, but "b" may also be said to be a width of the rectangle. Although W2 is in many cases equal to or close to W1 as discussed, in certain applications it may be desirable for W2 to be significantly different from W1, for example, W2 may be less than half of W1, or W2 may be 0.4*W1, or 0.3*W1.

The line of transition 128 is shown schematically in FIG. 2 as a dashed line, and may be either a line of weakness or a line of separation. The line of transition 128 is also shown as being straight and linear in plan view. The reader will understand that lines of transition, lines of weakness, and lines of separation discussed herein may in some cases be straight and linear but in other cases may not be precisely straight and linear in plan view or may be intentionally curved and nonlinear in plan view.

Figure 3A:
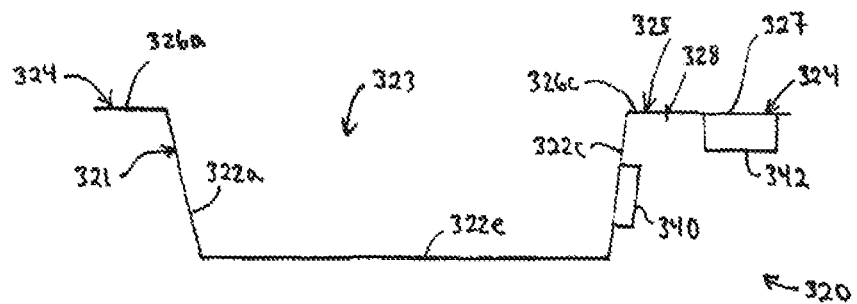
FIG. 3A is a schematic side or sectional view of a tray that includes locking features.
Figure 3B:
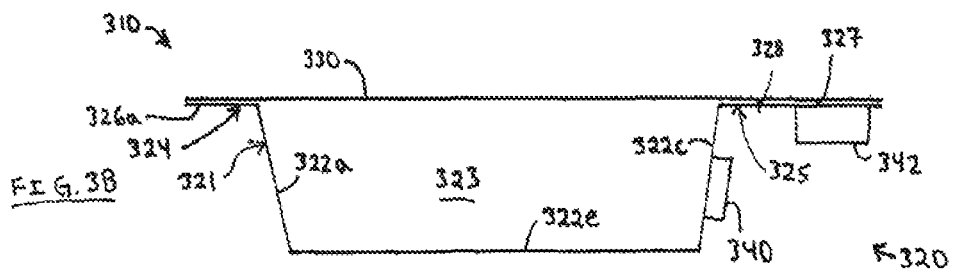
FIG. 3B is a schematic side or sectional view of a package that includes the tray of FIG. 3A and a lidding film attached thereto.
Figure 3C:
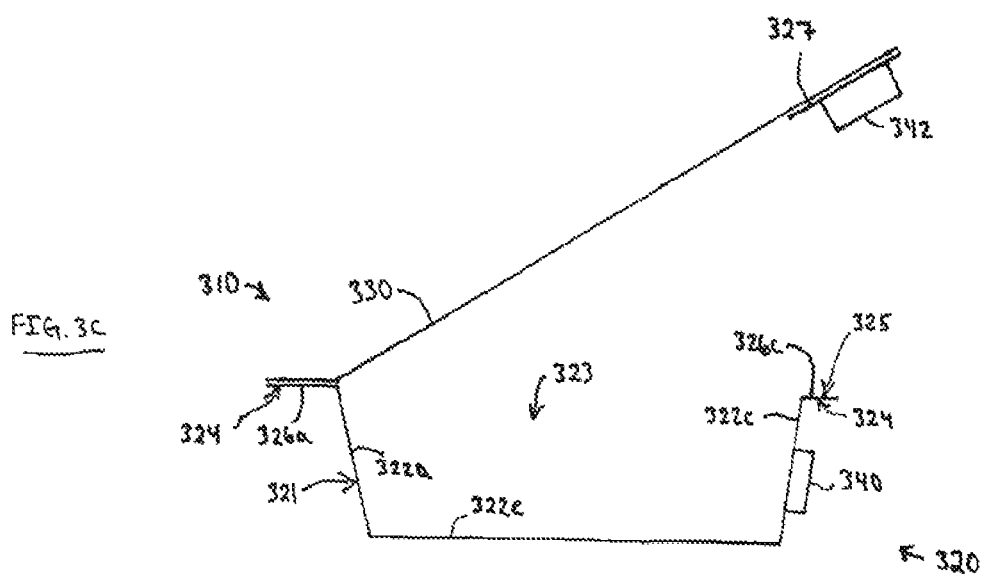
FIG. 3C is a schematic side or sectional view of the package of FIG. 3B with the lidding film in an open position.

FIGS. 3A through 3C show a package and its component parts similar to FIGS. 1A through 1C respectively, but where the tray is provided with locking features. Thus, in FIG. 3A, a tray 320 has a recessed portion 321 and a flange 324, the recessed portion 321 defining an open cavity 323. The recessed portion 321 includes side walls 322a and 322c, as well as a bottom wall or floor 322e. The flange 324 is divided by a line of transition 328 into two parts: a frame portion 325 and a margin portion 327. The frame portion 325 frames or surrounds the cavity 323, and includes end members 326a, 326c and side members (not shown in FIG. 3A) that connect the end members to each other. If the line of transition 328 is a line of weakness, portions of the flange 324 join the margin portion 327 to the end member 326c; otherwise, the line of transition 328 is a line of separation, and the margin portion 327 does not connect to the end member 326c. The foregoing elements and components the tray 320 may be the same as or similar to corresponding elements and components of the tray 120 described above, with no further discussion needed, except that, in the tray 320, the margin portion 327 and the side wall 322c closest to the margin portion are provided with locking features 342, 340 respectively. These locking features may be of any known design or configuration. They may be adapted to engage each other so as to hold the margin portion 327 and the side wall 322c together, i.e., to lock the margin portion 327 against the side wall 322c.

Conveniently, the locking features 340, 342 may be sized and positioned on their respective tray elements so that such locking can be accomplished simply by pivotably folding or bending the margin portion 327 along the line of transition 328 downward towards the adjacent side wall 322c, as shown below in FIG. 3D. In many cases the locking attachment is releasable or temporary, such that the margin portion 327 can be readily released or detached from the side wall 322c and so that the locking features 340, 342 can repeatedly engage and disengage each other. The locking features 340, 342 may also be imperforate. That is, the locking features 340, 342 may engage one another without the locking feature 342 puncturing a hole in, or otherwise perforating, the locking feature 340 or any other portion of the side wall 322c, such that the cavity 323 remains closed and sealed, e.g. airtight and watertight. In some cases the locking feature 340 may be a rigid or semi-rigid molded contour feature, e.g. including one or more protuberance and/or one or more depression or recess formed in the side wall 322c, and the locking feature 342 may likewise be a similar rigid or semi-rigid molded contour feature designed to mate with the contour of the locking feature 340. Mating between the locking features 340, 342 may be by a friction fit. The locking features 340, 342 may also be shaped to provide a snap-type closure that provides a physical (tactile) and/or audible indication to the user that the features 340, 342 have been locked (engaged) or unlocked (disengaged).

In FIG. 3B, the tray 320 is shown together with a lidding film 330 to provide a package 310. The lidding film 330 may be the same as or similar to lidding film 130 discussed above. Attachment of the lidding film 330 to the tray 320 may also be the same as or similar to attachments and seals as discussed above in connection with the lidding film 130. In FIG. 3C the package 310 is shown with the lidding film 330 in an open position, i.e., where the user has peeled the lidding film 330 apart from a portion of the tray 320 in order to access the product (not shown) disposed in the cavity 323. The user may first break the margin portion 327 away from the remainder of the tray 320 along the line of transition 328, if such line is a line of weakness. The lidding film 330 remains attached to the margin portion 327 (with its locking feature 342) after complete detachment of the margin portion 327 from the tray 320. Initially, the lidding film 330 also remains attached to the frame portion 325 of the (remaining) flange 324, but as the user pulls the margin portion 327 away from the tray 320, the lidding film 330 peels away from the end member 326c and from the side members (not shown in FIG. 3C), thus uncovering and exposing the contents of the cavity 323 as shown.

Figure 3D:
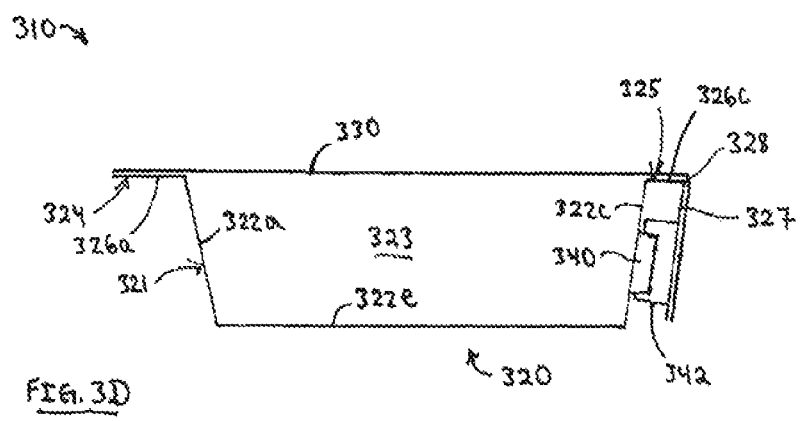
FIG. 3D is a schematic side or sectional view of the package of FIG. 3B with the margin portion locked against a side wall of the tray.

FIG. 3D shows the package 310 in a configuration in which the margin portion 327 has been pivotably folded or bent along the line of transition 328 and pressed against the side wall 322c so as to engage or lock the locking features 340, 342 together, thus holding the margin portion 327 in place against the side wall 322c. The package 310 may assume this configuration before the user initially opens the package, i.e., in some cases while the margin portion 327 is still connected to the end member 326c through the line of transition 328. However, the package 310 may also assume substantially the same configuration if the line of transition 328 is a line of separation rather than a line of weakness. The line of separation may in some cases be the remnants of a line of weakness that has been ruptured, e.g. after the user initially opens the package and consumes or otherwise takes some of the product in the cavity 323 and then stores the remaining product by re-sealing the lidding film against the frame portion 325 of the flange 324. In either case, i.e., whether the package 310 has been opened or not, and whether the line of transition 328 is a line of weakness or a line of separation, the lidding film 330 remains intact, or substantially intact, stretching from the end member 326a across the cavity 323 to the end member 326c and further to the margin portion 327.

Figure 3E:
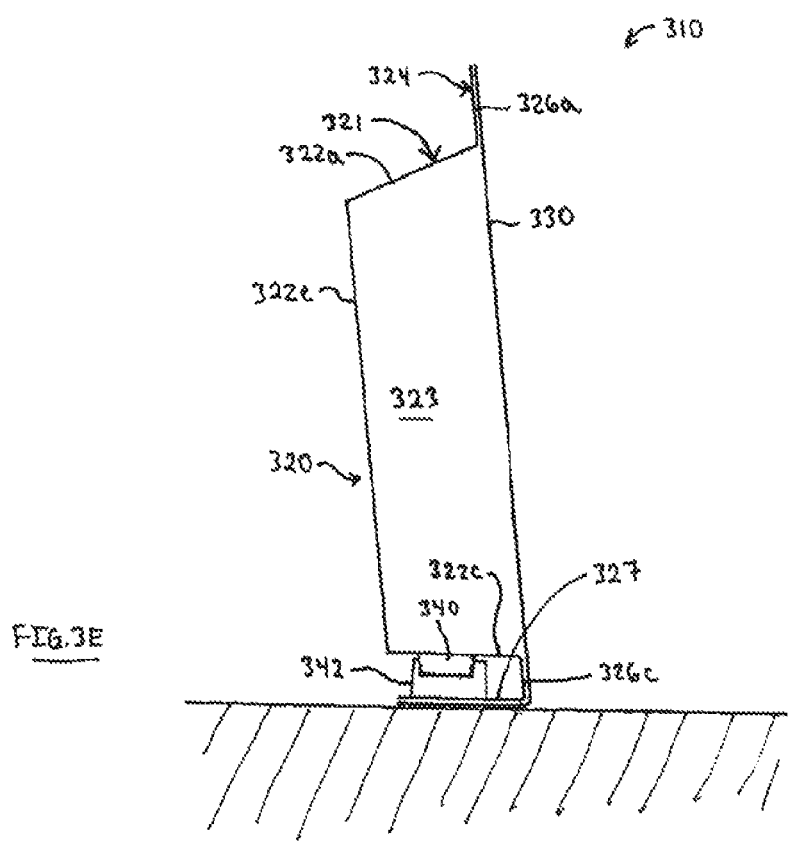
FIG. 3E is a schematic side or sectional view of the package of FIG. 3D, the package being placed upright on a level surface with the margin portion functioning as a base.

In some embodiments, the margin portion 327 is sized and shaped to function as a base upon which the package 310 can stably rest. Such a capability is shown in FIG. 3E. There, the package 310 is shown in the locked or engaged configuration of FIG. 3D, with the locking features 340, 342 mated together, but the package 310 has been turned on its end and placed on a shelf, tabletop, or other level surface. The package 310 is designed so that in this position, the center of gravity of the package 310 (whether in its unopened condition when it is loaded to contain an initial (full) amount of the pertinent product or after it has been opened and contains a lesser amount, or even none, of the product) is located directly above a point on the margin portion 327 so that the package 310 remains in a stable standing position. Stated differently, the center of gravity of the package is located on an axis that is generally perpendicular to and passes through the margin portion 327. This design feature provides a grocer or other merchant with options regarding how to display or present the product to end-users. For example, in addition to being hung from a hole (see e.g. hole 701 in FIG. 7A below) in the flange or being laid horizontally with the floor 322e resting against a shelf or tabletop, the package 310 can also be placed approximately vertically on such shelf or tabletop as shown in FIG. 3E.

Figure 4A:
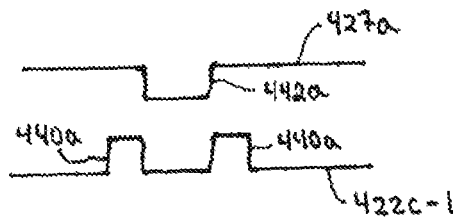
FIGS. 4A through 4D are schematic views of various locking features that can be used in the disclosed trays.
Figure 4B:
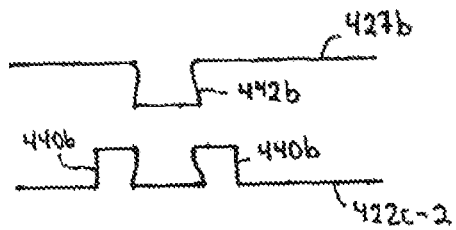
Figure 4C:
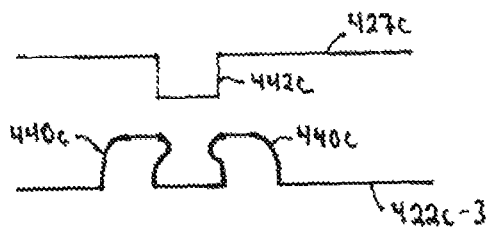
Figure 4D:
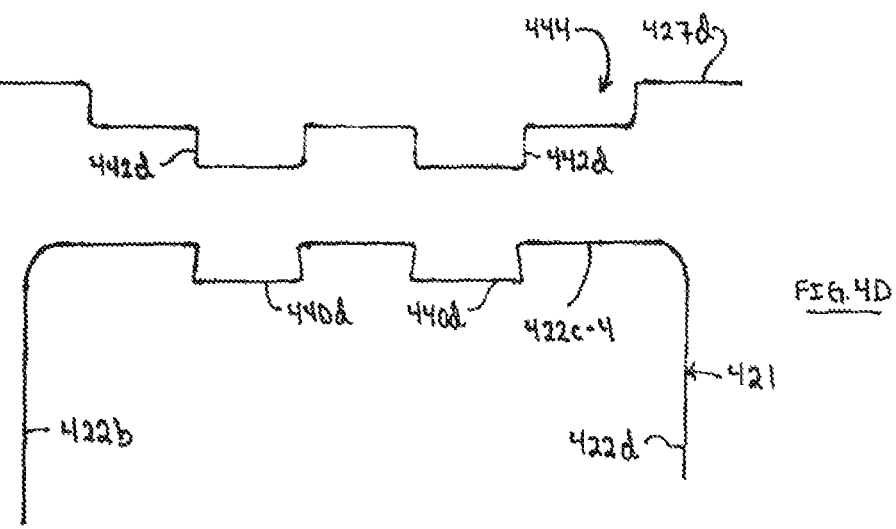

FIGS. 4A through 4D schematically illustrate some possible designs for the locking features. The contoured shapes in these figures include protuberances and depressions or recesses formed as integral portions of the respective parts to be joined, i.e., of the margin portion of the flange and the closest side wall that bounds the product-receiving cavity of the tray. Such contoured shapes may be rigid or semi-rigid molded portions of such parts. FIGS. 4A through 4C show only one pair of locking features. The reader will understand that a given tray and a given package may contain only one pair of locking features or it may contain multiple pairs of such features, e.g., two or three or more. When two or more pairs of locking features are provided, the pairs may all be of nominally the same design (e.g. all as shown in FIG. 4A or all as shown in FIG. 4B, etc. and the same to within manufacturing tolerances) or the pairs may all be of substantially different designs, or, if at least three pairs are provided, at least two of the pairs may be nominally the same while at least two of the pairs may be substantially different.

FIG. 4A depicts a portion of a tray that includes a margin portion 427a, and a side wall 422c-1 that bounds the product-receiving cavity of the tray and that is closest to the margin portion. A locking feature 442a is formed in the margin portion 427a, and a mating locking feature 440a is formed in the side wall 422c-1. These locking features may be sized so that the locking feature 442a press-fits into the depression formed by the locking feature 440a. When the locking features 442a, 440a are engaged, friction holds them together, but the friction may be small enough that a user can readily pull the locking features apart from each other. In an alternative embodiment, locking features may be interchanged such that locking feature 442a is formed in the side wall 422c-1 and mating locking feature 440a is formed in the margin portion 427a.

FIG. 4B depicts a portion of a tray that includes a side wall 422c-2 and a margin portion 427b. A locking feature 442b is formed in the margin portion 427b, and a mating locking feature 440b is formed in the side wall 422c-2. The locking feature 442b is a protuberance with a flared end, and a depression formed by the locking feature 440b is similarly flared and sized to provide a snap-type closure. The dimensions and material flexure may be sufficient to allow a user to readily pull the locking features apart from each other after they have been pressed together. In an alternative embodiment, locking features may be interchanged such that locking feature 442b is formed in the side wall 422c-2 and mating locking feature 440b is formed in the margin portion 427b.

FIG. 4C depicts a portion of a tray that includes a margin portion 427C, and a side wall 422c-3 that bounds the product-receiving cavity of the tray and that is closest to the margin portion. A locking feature 442c is formed in the margin portion 427c, and a mating locking feature 440c is formed in the side wall 422c-3. These locking features may be sized so that the locking feature 442c press-fits into a depression formed by the locking feature 440c. The depression formed by the locking feature 440c is flared such that the locking feature 440c pinches the sides of the locking feature 442c. When the locking features 442c, 440c are engaged, friction holds them together, but the friction may be small enough that a user can readily pull the locking features apart from each other. In an alternative embodiment, locking features may be interchanged such that locking feature 442c is formed in the side wall 422c-3 and mating locking feature 440c is formed in the margin portion 427c In FIG. 4D, a portion of a tray includes a margin portion 427d and a side wall 422c-4. The side wall 422c-4 together with other side walls, including side walls 422b, 422d, form a recessed portion 421 defining a product-receiving cavity of the tray. Locking features 442d are formed in the margin portion 427d, and mating locking features 440d are formed in the side wall 422c-4. In this embodiment, the locking features 442d are disposed in a recessed portion 444 of the margin portion 427d so that the locking features can engage each other with less rotation of the margin portion about the line of transition (see e.g. FIG. 3D). The protuberance-shaped locking features 442d may be slightly flared, and the depressions formed by the locking features 440d may be similarly flared to provide snap-type closures.

Figure 5A:
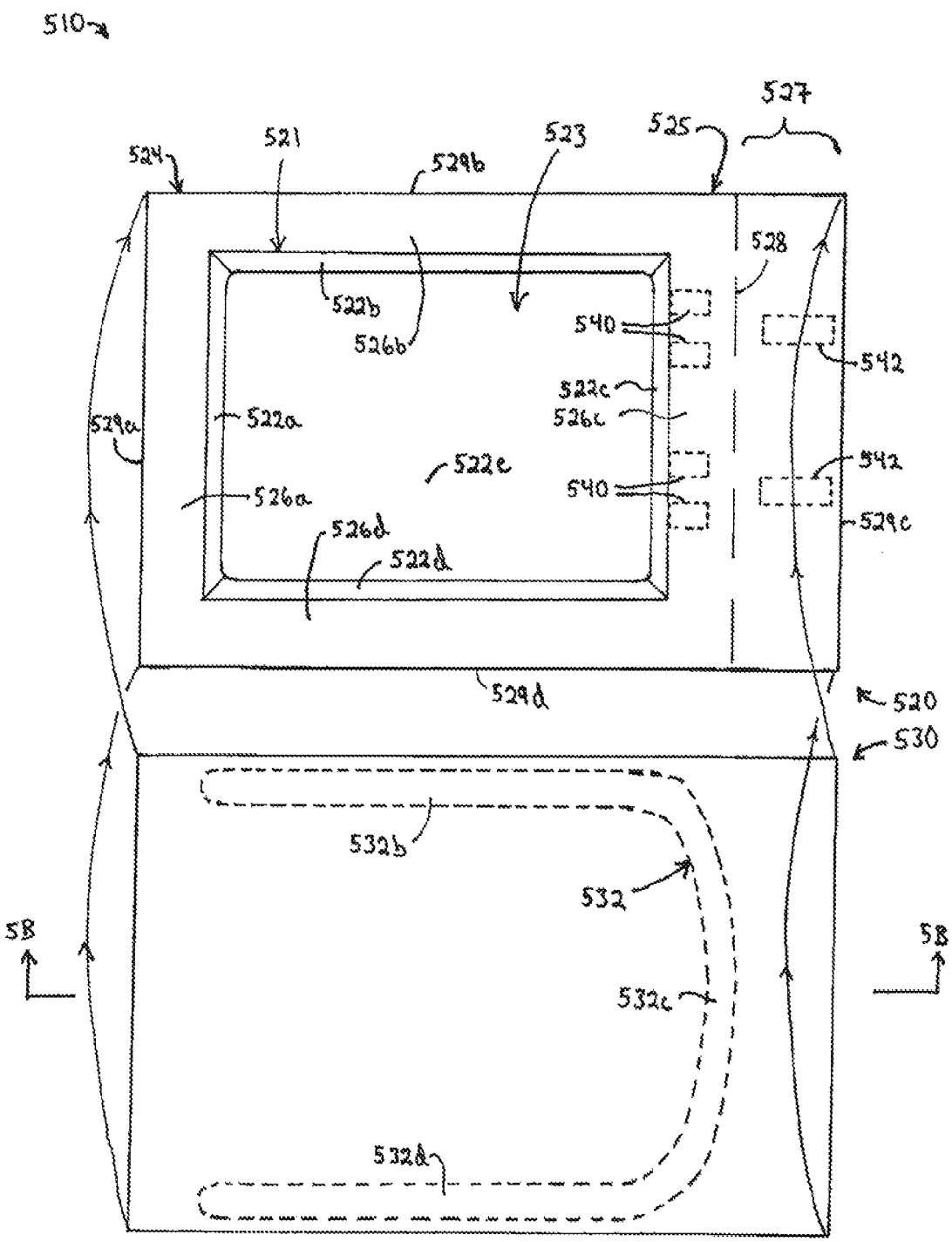
FIG. 5A is a schematic top view of a package similar to that of FIG. 2, but where the tray includes locking features and the lidding film is or includes a peelable/resealable film having a pattern-applied adhesive layer.
Figure 5B:
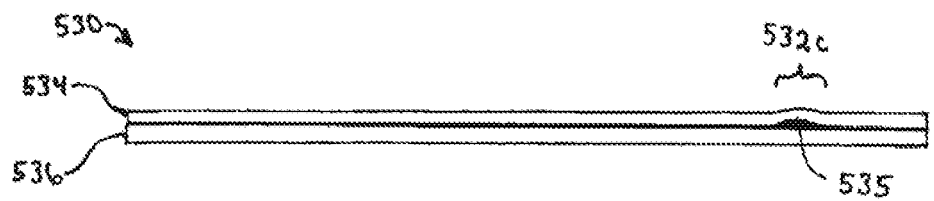
FIG. 5B is a schematic cross-sectional view of the lidding film of FIG. 5A, taken along line 5B-5B.
Figure 5C:
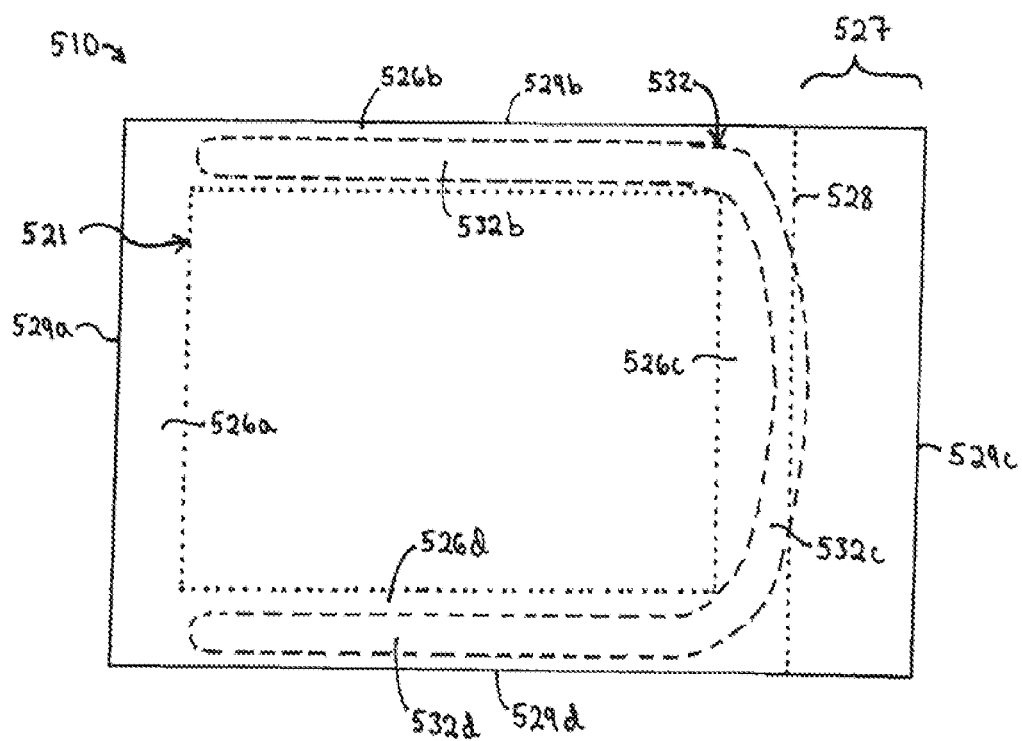
FIG. 5C is a schematic top view of the package of FIG. 5A, where the lidding film is shown atop the tray, and some features are omitted for simplicity.

FIGS. 5A through 5C schematically illustrate a package similar to those discussed above but where the lidding film is illustrated as a patterned lidding film having a weakened region that is susceptible to delamination relative to other areas of the film, such other areas by comparison being resistant to delamination. The weakened region of the lidding film is due to the incorporation of a pattern-applied adhesive layer within the lidding film. Lidding films of this general design are known in the art, such as, as non-limiting examples, films in the family of Smart Tack™ resealable packaging sold by Bemis Company, Inc. (Neenah, Wis.) and films described in International Application Number PCT/US13/49260 (filed Jul. 3, 2013 by Curwood, Inc.).

Thus, a package 510 includes a tray 520 and a lidding film 530, the lidding film 530 shown separated from the tray 520 for ease of illustration. The tray 520 may be the same as or similar to those discussed above. Thus, the tray 520 has a recessed portion 521 and a flange 524, the recessed portion 521 defining an open cavity 523. The recessed portion 521 includes side walls 522a, 522b, 522c, and 522d, as well as a bottom wall or floor 522e. The flange 524 is divided by a line of transition 528 into two parts: a frame portion 525 and a margin portion 527. The frame portion 525 frames or surrounds the cavity 523 and includes end members 526a, 526c and side members 526b, 526d that connect the end members to each other. If the line of transition 528 is a line of weakness, portions of the flange 524 join the margin portion 527 to the end member 526c; otherwise, the line of transition 528 is a line of separation, and the margin portion 527 does not connect to the end member 526c. The margin portion 527 and the side wall 522c closest to the margin portion are provided with locking features 542, 540 respectively, which may be the same as or similar to any of the locking features discussed above. The flange 524 is bounded by opposed outer edges 529a and 529c and by opposed outer edges 529b and 529d. The margin portion 527 may have a width that is the same as or approximately the same as the corresponding width of the tray 520 or the frame portion 525, for example, the ratio of such widths may be in a range from 0.8 to 1.2 or from 0.9 to 1.1 as discussed above. Alternately, in some cases, the width of the margin portion may be substantially different from, e.g. substantially less than, that of the tray and/or frame portion.

The lidding film 530 attaches or seals to the flange 524 or, more specifically, to the frame portion 525 of the flange 524, along a closed path so as to seal the cavity 523 and isolate the product it holds. The lidding film 530 also attaches to the margin portion 527 of the flange 524. The lidding film 530 is assumed to attach to the flange 524 over substantially all of the upper exposed surfaces of the flange 524 including surfaces of both the frame portion 525 and the margin portion 527. Such attachment may be done by heat sealing the lidding film 530 to the flange 524, and/or it may be done using an adhesive or other suitable bonding material or means interposed between the lidding film 530 and the flange 524.

The lidding film 530 is a patterned multilayer polymer film. The patterning, which is provided by a pattern-applied adhesive layer internal to the film, causes the lidding film 530 to be weakened in areas where the adhesive is present. In the lidding film 530, the adhesive is, as an example, patterned in a U-shaped path shown as weakened region 532. The weakened region 532 has side portions 532b, 532d and an end portion 532c that are connected as shown to form a U-shape. A cross-sectional view of the lidding film 530 along the line 5B-5B is shown in FIG. 5B. In this view, the film 530 can be seen to include a first film 534 and a second film 536, and the adhesive 535 can be seen to be present in the end portion 532c of the weakened region 532 but not present elsewhere between the films 534, 536 in this cross-sectional plane. Each film 534, 536 may be a single layer polymer film or a multiple layer polymer film of suitable composition and thickness. In regions where the adhesive 535 is not present, the films 534, 536 form a strong bond to each other, thus being resistant to delamination. In the weakened region 532, the adhesive 535 forms a relatively weaker bond between the films 534, 536, such that the films 534, 536 are susceptible to delamination in that region.

The lidding film 530 is aligned or registered relative to the tray 530 (after loading the product into the cavity 523) and then attached thereto, e.g. by heat sealing the lidding film 530 to substantially all of the upper exposed surfaces of the flange 524. A top view of the resulting package 510 is shown in FIG. 5C, where the locking features and side walls of FIG. 5A are omitted for simplicity. The three portions 532b, 532c, 532d of the weakened region 532 can be seen to be in at least partial registration with the side member 526b, the end member 526c, and the side member 526d, respectively, of the flange 524. Because of this, and because the lidding film 530 is susceptible to delamination in the weakened region 532, attachment of the lidding film to the members 526b, 526c, 526d is characterized by a peelable seal, whereas attachment of the lidding film 530 to other portions of the flange 524, such as end member 526a and margin portion 527 (despite some overlap of the weakened region 532 with the margin portion) is characterized chiefly by a non-peelable seal. In alternative embodiments, the shape of the weakened region 532 can be modified as desired, e.g., it may be modified into an "O" shape to also overlap with the end member 526a, or it may be modified to overlap to a greater extent, or to a lesser extent, with the margin portion 527.

When a user wishes to open the package 510 for the first time, the user (a) grasps the margin portion 527, which is attached to the lidding film 530, (b) if the line of transition 528 is a line of weakness, detaches the margin portion 527 from the frame portion 525 by breaking the connection along the line of weakness (the lidding film 530 may remain completely intact during this step), and (c) using the margin portion 527 as a handle, peels the lidding film 530 apart from at least the members 526b, 526c, 526d of the frame portion 525 along the weakened region 532 to open the cavity 523 and create a flap, e.g. as shown in FIG. 1C or 3C. Peeling of the lidding film 530 apart from the members 526b, 526c, 526d is accompanied by, for example, the rupturing or splitting of the bond between second film 536 and first film 534 at the weakened region 532. Portions of the second film 536 that correspond substantially to the weakened region 532 remain attached to the flange 540, while the other portions of the second film 536 remain attached to the first film 534 and separate from the flange 540 to form part of the flap. In the weakened region 532, where the first and second films delaminate from each other, some of the adhesive 535 may remain on each of the films 534, 536 after delamination, to facilitate re-sealing of the lidding film 530 to the tray 520 when the flap is lowered.

In alternative embodiments, the lidding film may be or comprise a peelable/resealable film that is not patterned or that at least has an unpatterned or continuous adhesive or other layer along which delamination is designed to occur. Lidding films of this general design are known in the art, and are sometimes referred to as coextrusion peelable/resealable films. See, for example, lidding films described in patent application publications US 2006/0172131 (Haedt et al.) and US 2007/0082161 (Cruz et al.). Such a lidding film is schematically depicted as lidding film 630 in the partial package 610 shown in FIGS. 6A and 6B. In these figures, the lidding film 630 is attached to the flange of a tray 620, which may be the same as or similar to other trays disclosed herein. The tray 620 is shown schematically, the flange of which has a frame portion 625 and a margin portion 627, with a line of transition 628 therebetween, as discussed above. The line of transition 628 is illustrated as a line of separation, but it may alternatively be a line of weakness.

Figure 6A:
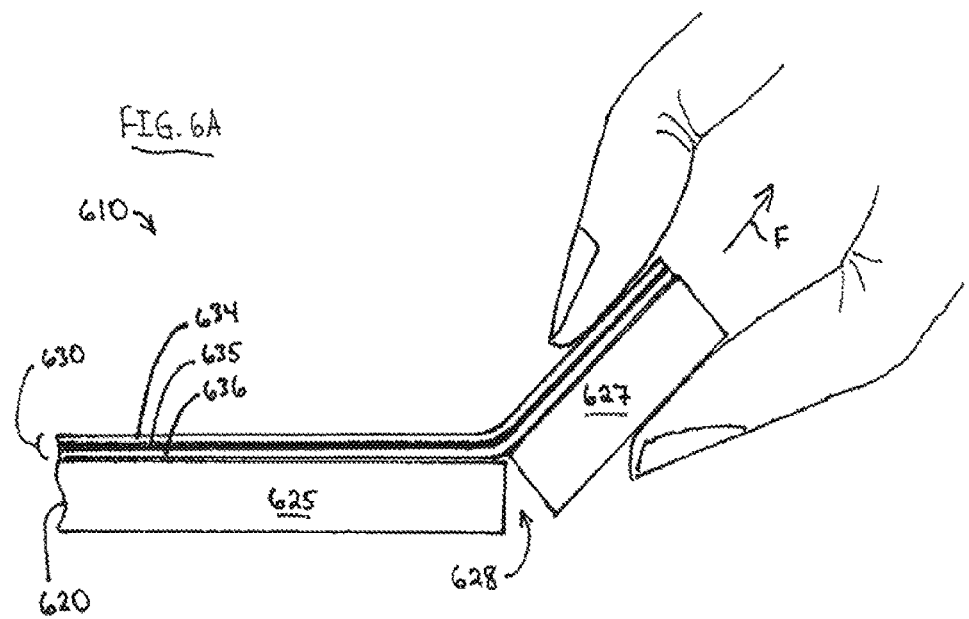
FIGS. 6A and 6B are schematic side or sectional views of a portion of a package in which the lidding film is a peelable/resealable film having an unpatterned adhesive layer, these figures showing a user in the process of opening the package.

The lidding film 630 is an unpatterned multilayer polymer peelable/resealable film. As shown in FIG. 6A, in an initial state before the package 610 is opened, the lidding film 630 includes, for example, a first film 634, a second film 636, and a layer of adhesive 635. The adhesive 635 is provided in a uniform layer in substantially all regions of the film 630 rather than being patterned. Each film 634, 636 may be a single layer polymer film or a multiple layer polymer film of suitable composition and thickness. In some cases, the films 634, 636, and the, for example, adhesive layer 635 may all be coextruded in one fabrication process to manufacture the film 630, hence the name coextrusion peelable/resealable film. In any case, unlike the patterned lidding film 530, the lidding film 630 is substantially spatially uniform. Consequently, when the lidding film 630 is attached to the flange of the tray, such as with a heat seal process, attachment at some regions is not inherently more susceptible to delamination than at other regions. Nevertheless, due to the relative bond strengths of layer 635 and second film 636 compared to that of second film 636 and tray 620 and due to the forces acting on the lidding film 630 during the opening process and, in particular, the concentration of forces at the boundary between the margin portion 627 and the frame portion 625 (i.e., near the line of transition 628 as, for example, a line of separation or a ruptured line of weakness 628), the lidding film 630 can be designed to reliably and repeatably (in the aggregate for a plurality of packages) rupture at such boundary and from that boundary to delaminate along the end portion and side portions corresponding to portions 526b, 526c, 526d of FIG. 5C, thus opening the package 610 as desired.

Figure 6B:
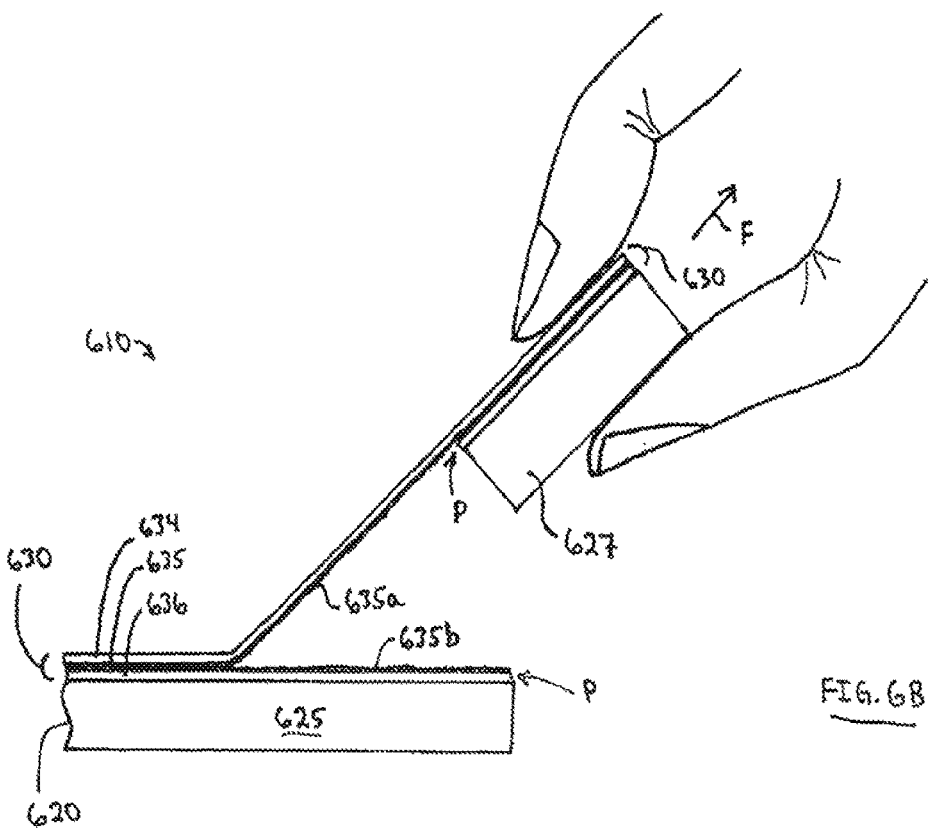

Such an opening procedure is depicted in FIGS. 6A and 6B. In FIG. 6A, a user (who in some cases may have already detached the margin portion 627 from the frame portion 625 along the line of transition 628) pulls the margin portion 627 and lidding film 630 with a force F. The forces concentrate in the lidding film 630 at the boundary between the margin portion 627 and the frame portion 625. As seen in FIG. 6B, the second film 636 ruptures at this point, the ends of the ruptured film labeled P. The lidding film 630 begins delaminating at this point generally along the frame portion 625 of the flange, and as the user continues to pull the margin portion 627, delamination of the lidding film 630 and rupturing of the second film 636 occurs along the end portion and side portions corresponding to portions 526b, 526c, 526d of FIG. 5C, thus creating a flap (see e.g. FIGS. 1C and 3C) and opening the package 610. Despite this rupturing of the second film 636, the lidding film 630 remains substantially intact such that it may be made to completely cover the product-receiving cavity again if desired.

FIGS. 7A through 8F show various views of trays that may be suitable for use in the disclosed packages when combined with a suitable lidding film. Except as otherwise indicated, these trays, and/or their component elements may be the same as or similar to the trays and/or elements discussed above.

Figure 7A:
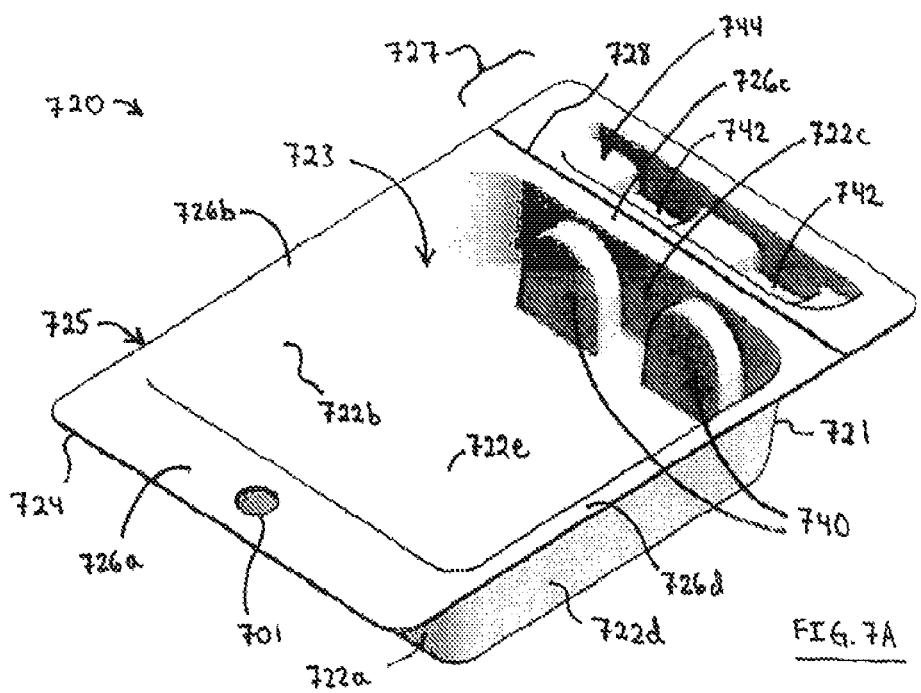
FIG. 7A is a perspective view of a tray suitable for use in the disclosed packages.

In FIG. 7A, a tray 720 has a recessed portion 721 and a flange 724, the recessed portion 721 defining an open cavity 723. The recessed portion 721 includes side walls 722a, 722b, 722c, and 722d, as well as a bottom wall or floor 722e. The flange 724 is divided by a line of transition 728 into two parts: a frame portion 725 and a margin portion 727. The frame portion 725 frames or surrounds the cavity 723, and includes end members 726a, 726c and side members 726b, 726d that connect the end members to each other. If the line of transition 728 is a line of weakness, portions of the flange 724 join the margin portion 727 to the end member 726c; otherwise, the line of transition 728 is a line of separation, and the margin portion 727 does not connect to the end member 726c (but is shown disposed alongside the end member 726c as it would be held in place e.g. by a lidding film, not shown). The margin portion 727 has a width substantially equal to that of the flange 724 and frame portion 725. The margin portion 727 and the side wall 722c closest to the margin portion are provided with imperforate locking features 742, 740 respectively. These locking features may be sized and shaped to mate with each other with a friction fit and/or to provide a snap-type closure that provides a physical and/or audible indication to the user when the features 740, 742 are locked or unlocked. The margin portion 727 also includes a recessed portion 744 in which the locking features 742 are disposed so that the locking features may, for example, engage each other with less rotation of the margin portion about the line of transition 728. A hole 701 may be provided in the flange 724 so that the package made using the tray 720 can be hung from a rod or hook, if desired.

The tray 720 may be made to have any suitable dimensions, but in one embodiment, the flange 724 has transverse horizontal dimensions of 16.4 cm by 11.2 cm, the frame portion 725 has transverse horizontal dimensions of 13.8 cm by 11.2 cm, the margin portion 727 has transverse horizontal dimensions of 2.6 cm by 11.2 cm, and the cavity 723 has a depth (from the floor 722e to the flange 724) of 2.5 cm and transverse horizontal dimensions (at half the depth) of roughly 10.5 cm by 9.8 cm, for a volume of roughly 260 cm$^3$.

Figure 7B:
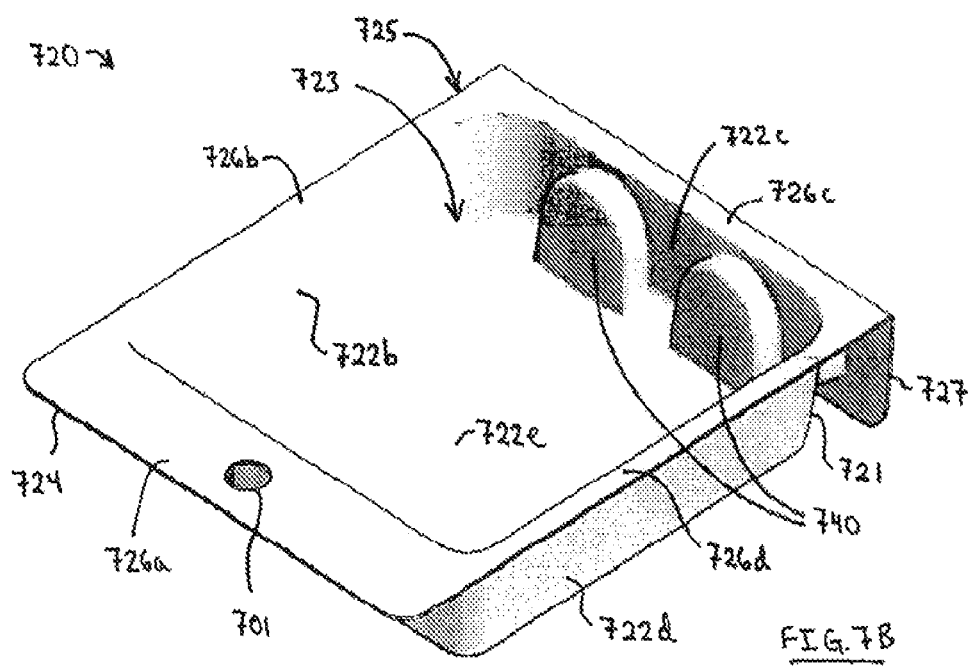
FIG. 7B is a perspective view of the same tray but with the margin portion of the flange folded down towards a side wall.

FIG. 7B shows a perspective view of the same tray 720, but where the margin portion 727 is folded down towards the side wall 722c, the locking features 742 being engaged or mated with the corresponding locking features 740. Otherwise, like reference numerals to those in FIG. 7A designate like elements and need no further discussion.

Figure 8A:
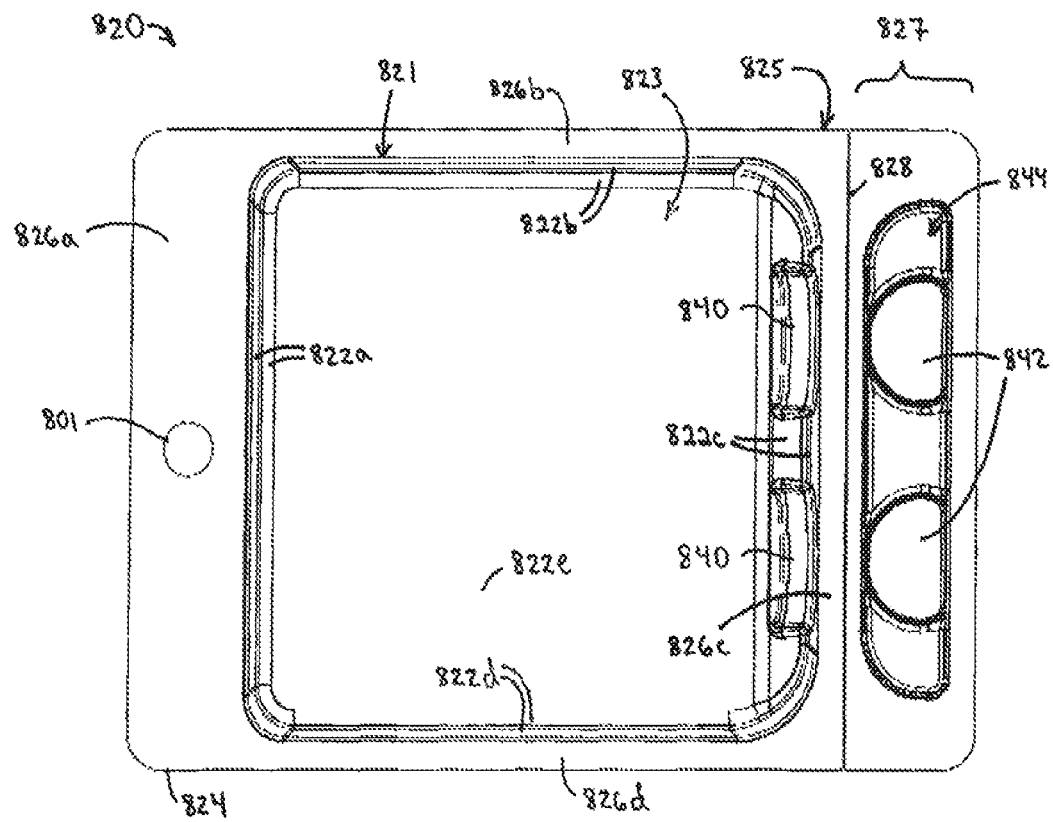
FIG. 8A is a schematic top view of a tray that may be the same as or similar to that of FIG. 7A.

FIG. 8A provides a top view of a tray 820 suitable for use in the disclosed packages. The tray 820 has a recessed portion 821 and a flange 824, the recessed portion 821 defining an open cavity 823. The recessed portion 821 includes side walls 822a, 822b, 822c, and 822d, as well as a bottom wall or floor 822e. The flange 824 is divided by a line of transition 828 into two parts: a frame portion 825 and a margin portion 827. The frame portion 825 frames or surrounds the cavity 823, and includes end members 826a, 826c and side members 826b, 826d that connect the end members to each other. If the line of transition 828 is a line of weakness, portions of the flange 824 join the margin portion 827 to the end member 826c; otherwise, the line of transition 828 is a line of separation, and the margin portion 827 does not connect to the end member 826c. The margin portion 827 has a width substantially equal to that of the flange 824 and frame portion 825. The margin portion 827 and the side wall 822c closest to the margin portion are provided with imperforate locking features 842, 840 respectively. These locking features may be sized and shaped to mate with each other with a friction fit and/or to provide a snap-type closure that provides a physical and/or audible indication to the user when the features 840, 842 are locked or unlocked. The margin portion 827 also includes a recessed portion 844 in which the locking features 842 are disposed so that the locking features may, for example, engage each other with less rotation of the margin portion about the line of transition 828. A hole 801 may be provided in the flange 824 so that the package made using the tray 820 can be hung from a rod or hook, if desired. The tray 820 may be the same as or similar to the tray 720 of FIG. 7A.

Figure 8B:
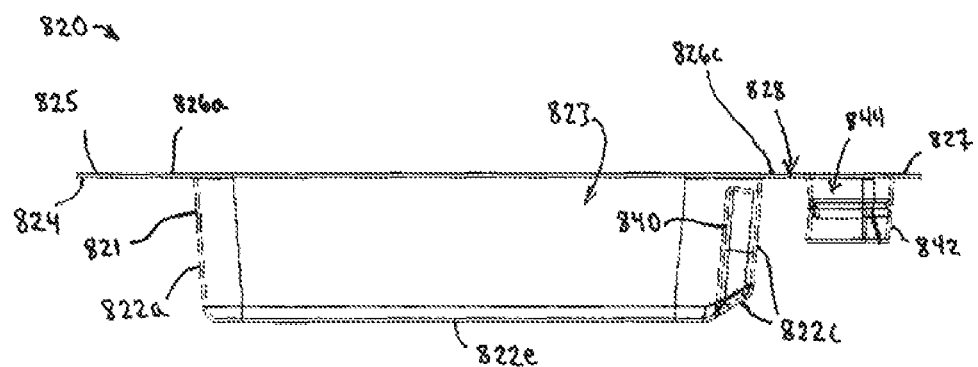
FIG. 8B is a schematic side or sectional view of the tray of FIG. 8A.

FIG. 8B is a schematic side or sectional view of the tray 820. Like reference numerals to those in FIG. 8A designate like elements and need no further discussion.

Figure 8C:
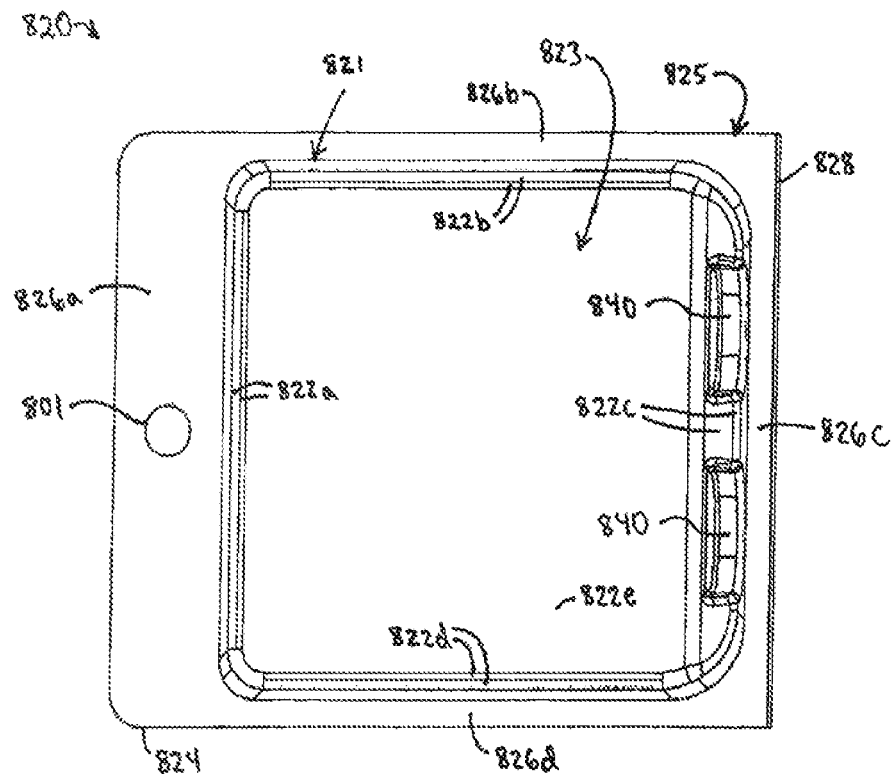
FIG. 8C is a schematic top view of the tray of FIG. 8A but with the margin portion of the flange folded down towards a side wall.
Figure 8D:
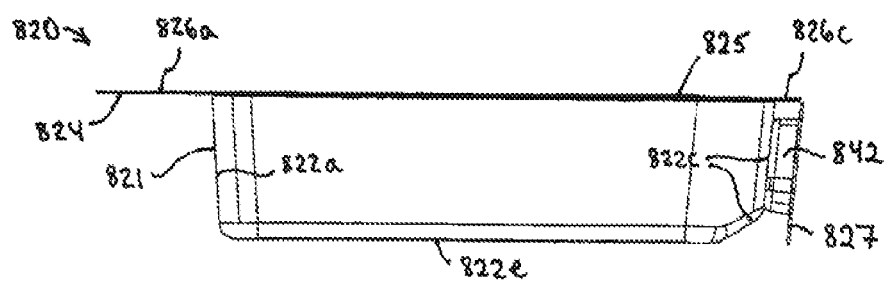
FIG. 8D is a schematic side or sectional view of the tray of FIG. 8C.

Similar to FIG. 8A, FIG. 8C also shows a top view of the same tray 820, but here the margin portion 827 has been folded down towards the side wall 822c so that the locking features 842 are engaged or mated with the corresponding locking features 840. FIG. 8D shows a side or sectional view of the tray 820 in the same folded configuration. Like reference numerals to those in FIGS. 8A and 8B designate like elements.

Figure 8E:
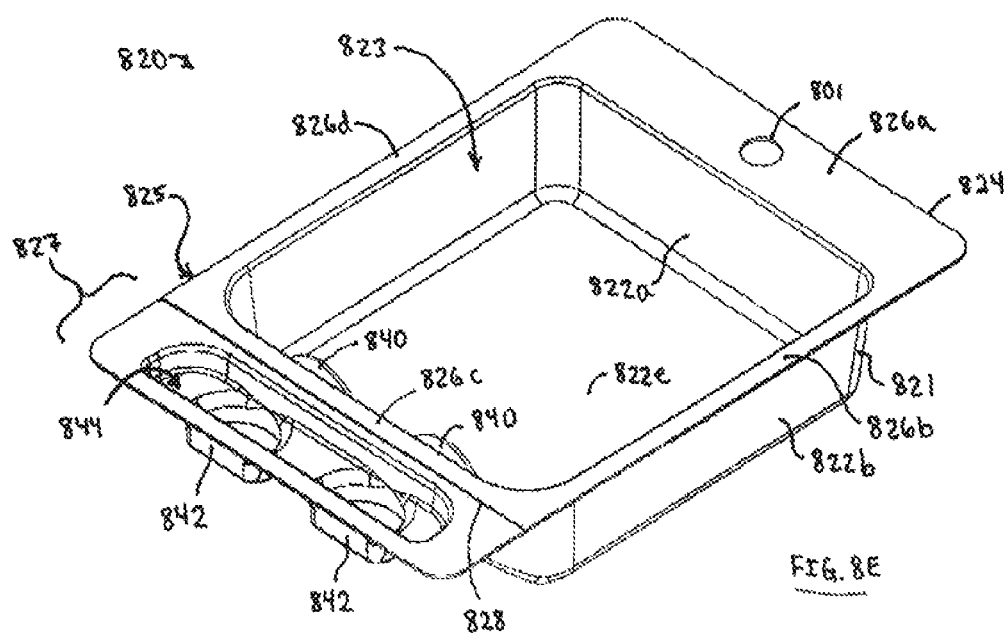
FIG. 8E is a perspective view of the tray of FIG. 8A.
Figure 8F:
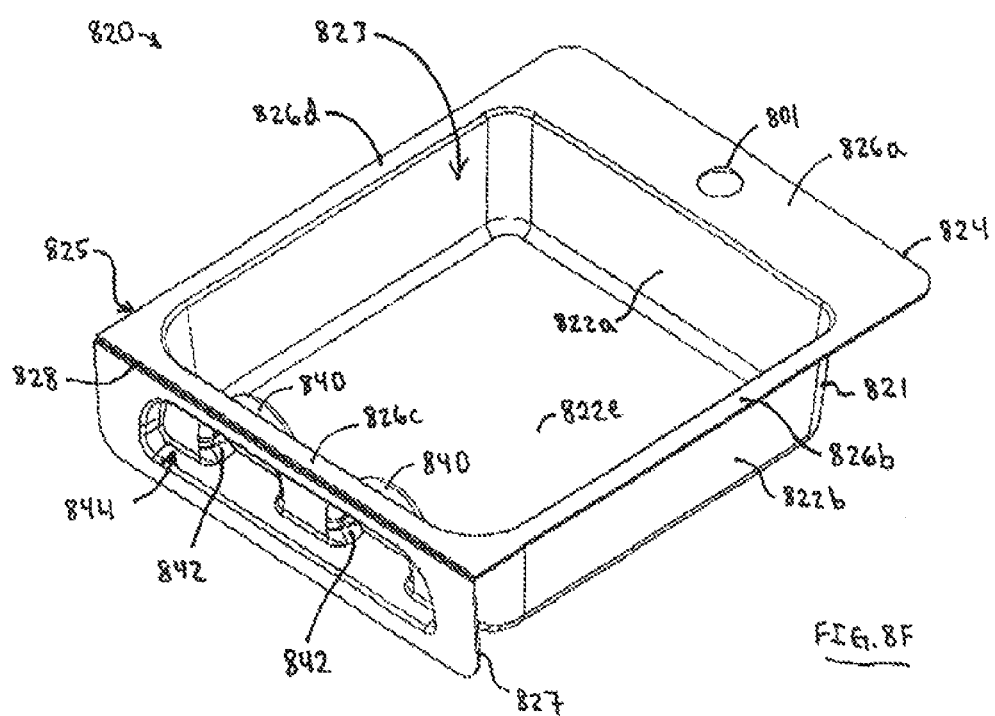
FIG. 8F is a perspective view of the tray of FIG. 8C.
Figure 8G:
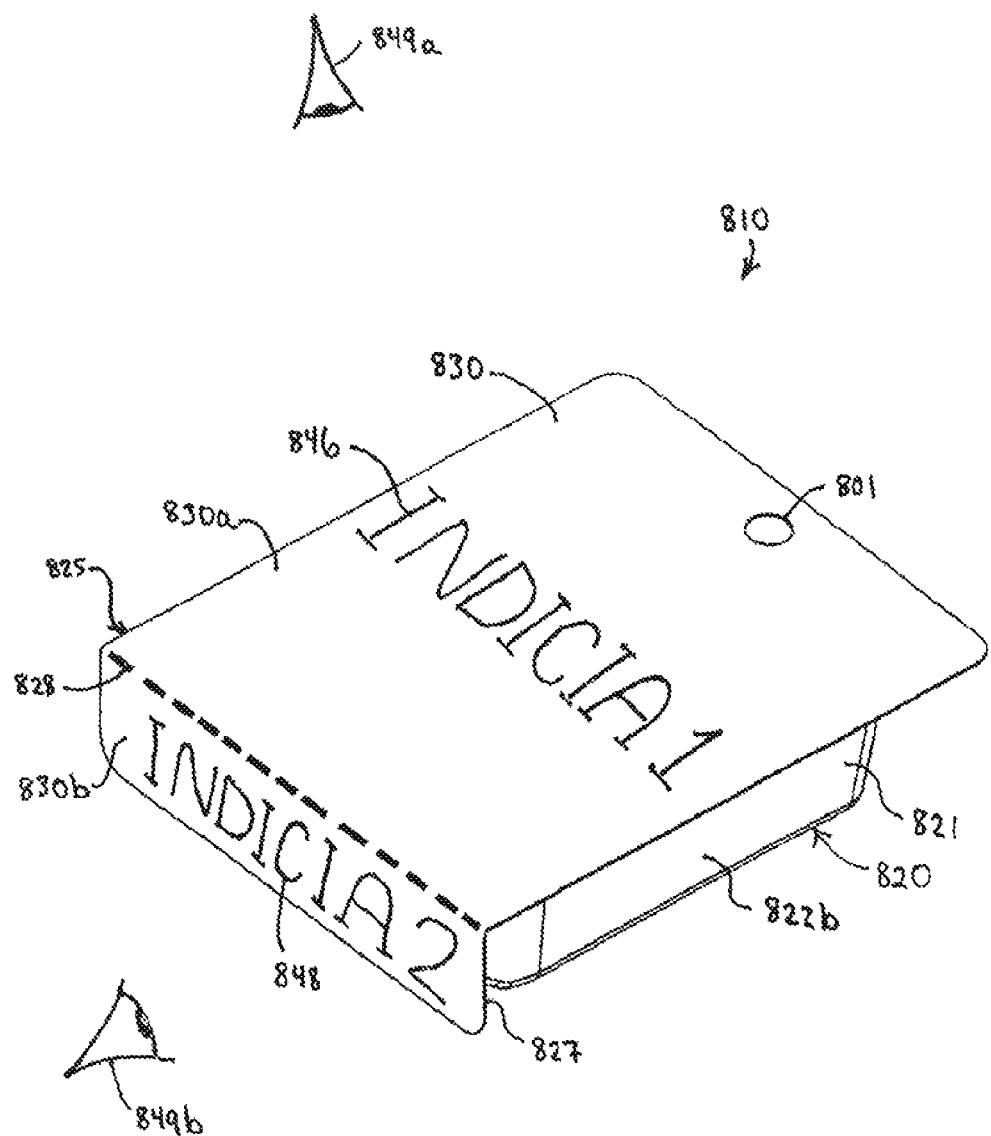
FIG. 8G is a perspective view of a package employing the tray of FIG. 8F, the package also including a lidding film with indicia thereon.

For completeness, FIGS. 8E and 8F show perspective views of the same tray 820, with FIG. 8E showing the tray in a straight or unfolded configuration (see FIGS. 8A and 8B), and FIG. 8F showing the tray in the folded configuration (see FIGS. 8C and 8D). Like reference numerals to those in FIGS. 8A-8D designate like elements.

When a tray such as that of FIGS. 7A through 8F is used in combination with a lidding film to package a given product, the capability of the margin portion to flex, bend, pivot, or rotate to engage a side wall of the recessed portion provides an opportunity for the (single piece of) lidding film to display product information on two different viewing sides or surfaces of the package. This is shown schematically in the perspective view of FIG. 8G. In this figure, a package 810 is made by applying a lidding film 830 to the above-described tray 820 after filling the product-receiving cavity 823 with a suitable product. Typically, the lidding film 830 is applied to the tray when the margin portion 827 is in a straight or unfolded configuration (see FIGS. 8A, 8B, 8E). After sealing the lidding film 830 to the flange 824 of the tray 820, the margin portion 827 is folded or rotated downwards and pressed against the side surface 822c so that the locking features 840, 842 engage (see FIGS. 8C, 8D, 8F). By providing the lidding film 830 with suitably printed product information and by appropriately organizing such product information on the lidding film, product information can be displayed on different viewing sides of the package 810. The lidding film 830 is thus shown as having printed thereon indicia in the form of a first indicia image 846 and a second indicia image 848. The indicia are shown as alphanumeric characters that spell "INDICIA 1" and "INDICIA 2", but the indicia may alternatively be or comprise any other alphanumeric characters, symbols, graphics, colors, or the like. The indicia is laid out on the lidding film 830 such that the first indicia image 846 is on a first region 830a of the lidding film that covers the cavity 823 and the frame portion 825, and the second indicia image 848 is on a second region 830a of the lidding film that covers the margin portion 827. When the package 810 is laid horizontally such that the floor 822e rests on a shelf or other level surface, the first region 830a of the lidding film faces generally upward to provide a top label visible to a first observer 849a from above, and the second region 830b of the lidding film faces generally sideways to provide a side label visible to a second observer 849b from the side. Thus, in the folded package configuration of FIG. 8G, the lidding film 830 is folded such that, from a top view of the package, the first indicia image 846 is visible (for example, to the observer 849a), and from a side view of the package, the second indicia image 848 is visible (for example, to the observer 849b). In the depicted embodiment, due to the angle between frame portion 825 and the margin portion 827, the second indicia image 848 is not substantially visible from the top view and the first indicia image 846 is not substantially visible from the side view.

Figure 9:
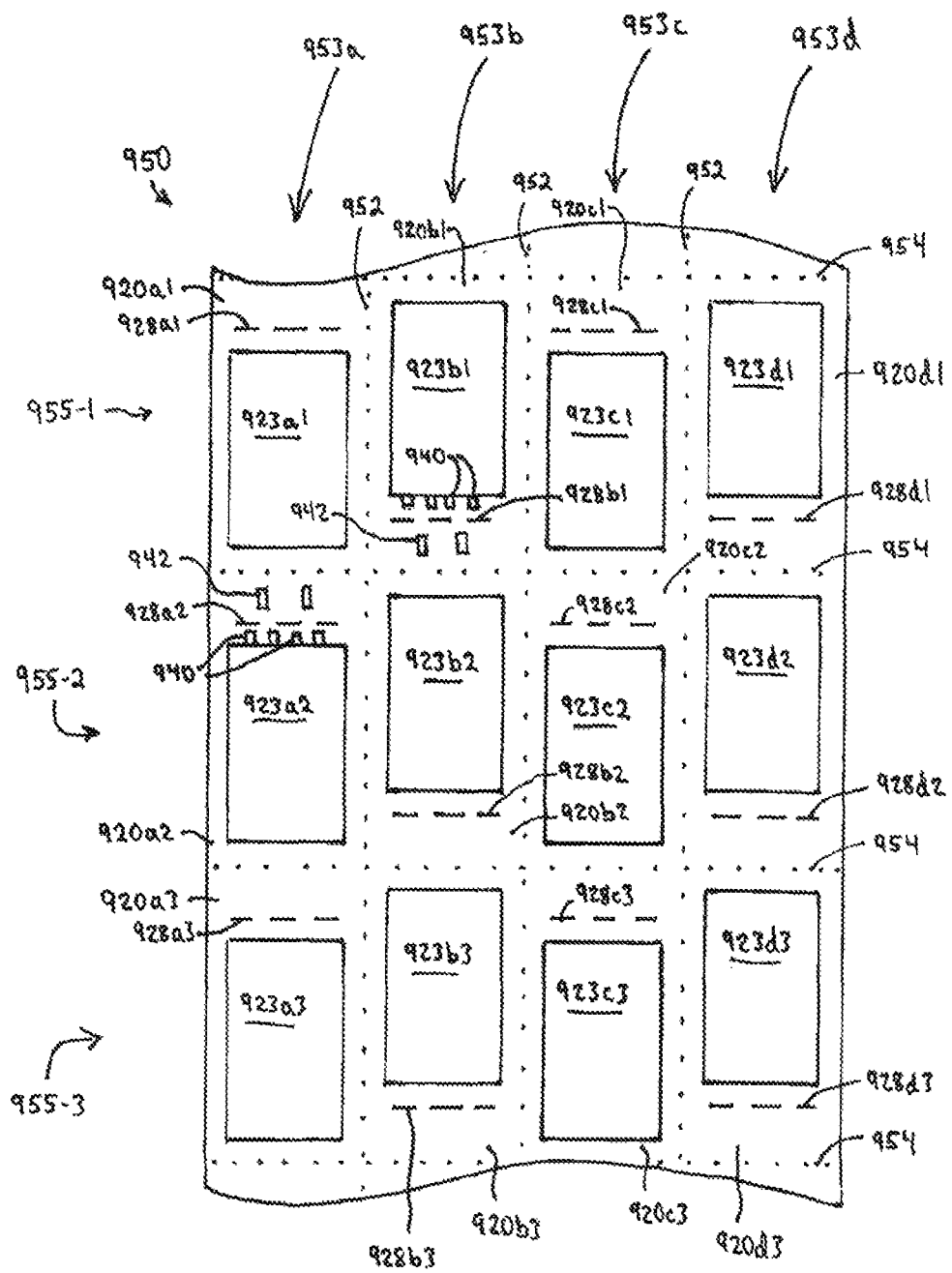
FIG. 9 is a schematic top view of a portion of a thermoplastic sheet in which an array of features have been formed to define trays suitable for use in the disclosed packages, the trays being separable from each other by slitting or cutting along longitudinal and transverse cut lines.

Although the disclosed trays and lidding films can be made as individual piece parts and loaded with product and sealed to each other individually, more typically the trays and lidding films are made in larger webs or sheets for increased speed and efficiency and then cut apart, or slit, or otherwise subdivided to provide the individual sealed packages. FIG. 9 shows a top view of a portion of a (single) thermoplastic sheet 950 in which an array of features have been formed to define trays suitable for use in the disclosed packages. A lidding film sheet of comparable size may be attached or sealed to the various flange portions of the thermoplastic sheet 950, e.g. by heat sealing, after all of the product-receiving cavities have been filled with the desired product. The resulting combination can then be converted (e.g., slit, cut, or otherwise subdivided) to provide the individual completed packages.

The thermoplastic sheet 950 has been thermoformed or otherwise molded or shaped to provide an array of features tailored so that, by subdividing the sheet 950 using a knife, laser, or other suitable cutting means generally along longitudinal cut lines 952 and along transverse cut lines 954, individual molded or shaped trays such as any of those disclosed above are produced. The trays to be produced in this way are labeled 920a1, 920a2, 920a3, 920b1, 920b2, 920b3, 920c1, 920c2, 920c3, 920d1, 920d2, and 920d3 (collectively 920), which have respective product-receiving cavities 923a1, 923a2, 923a3, 923b1, 923b2, 923b3, 923c1, 923c2, 923c3, 923d1, 923d2, and 923d3 (collectively 923), and respective lines of transition 928a1, 928a2, 928a3, 928b1, 928b2, 928b3, 928c1, 928c2, 928c3, 928d1, 928d2, and 928d3 (collectively 928). The trays 920 are arranged in longitudinal rows 953a, 953b, 953c, 953d, and in transverse rows 955-1, 955-2, 955-3. The trays 920 may also include locking features formed in the sheet 950, only some of which are shown in FIG. 9 and labeled as locking features 940, 942.

In order to enhance the strength of the sheet 950, particularly after the lines of transition 928 have been formed therein, the features that define the trays may be arranged so that two adjacent trays that are bounded by the same longitudinal cut line 952 are oriented in opposite directions, such that their respective lines of transition 928 are not in registration with each other. For example, the trays 920a1 and 920b1 are adjacent each other and bounded by a shared longitudinal cut line 952, but they are oriented oppositely so that the line of transition 928a1 is not in registration with the line of transition 928b1. This pattern may be repeated throughout the sheet 950 to reduce or eliminate the occurrence of lines of transition 928 for adjacent trays being in registration with each other. In this manner, the strength of the sheet 950 can be enhanced and unintended or undesirable breakage of the sheet 950 along the lines of transition 928 can be avoided during processing steps before individual subdivision, such as during loading the product into the cavities 923 and sealing the lidding film sheet to the loaded thermoplastic sheet 950. Thus, as shown, the trays 920 may be arranged in rows including a first and second row adjacent to each other (e.g. longitudinal rows 953a, 953b), and the trays 920 in the first row (e.g. longitudinal row 953a) may be oriented in a first direction, and the trays 920 in the second row (e.g. longitudinal row 953b) may be oriented in a second direction opposite the first direction. Also, the trays 920 in a given transverse row (e.g. transverse row 955-2) can alternate between the first and second opposite orientations. Also, first and second adjacent trays (e.g. trays 920a2 and 920b2) that are each bounded by a first longitudinal cut line 952 and a first and second transverse cut line 954 may be oriented oppositely such that the line of transition 928a2 for the first tray 920a2 is not in registration with the line of transition 928b2 for the second tray 920b2.

Unless otherwise indicated, all numbers expressing feature sizes, amounts, ranges, limits, and physical and other properties used in the specification and claims are to be understood as being modified in all instances by the term "about". Accordingly, unless indicated to the contrary, the numerical parameters set forth in the specification and claims are approximations that can vary depending on the desired properties sought to be obtained by those skilled in the art utilizing the teachings disclosed herein.

As used in this specification and the appended claims, the singular forms "a," "an," and "the" encompass embodiments having plural referents, unless the context clearly dictates otherwise. As used in this specification and the appended claims, the term "or" is generally employed in its sense including "and/or" unless the context clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

When a given element (including one or more elements, components, layers, or the like) is described as being "on," "connected to," "coupled to," or "attached to" another element (including one or more elements, components, layers, or the like), the given element can be directly on, directly connected to, directly coupled to, or directly attached to such other element, or an intervening element (including one or more elements, components, layers, or the like) may be interposed between the given element and the other element. When the given element is referred to as being "directly on," "directly connected to," "directly coupled to," "directly attached to," or "in contact with" the other element, there are no, or substantially no, intervening elements.

Various modifications of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference in their entireties to the extent they do not contradict the foregoing disclosure.

This application discloses a variety of items relating to packages. These include, but are not limited to, the numbered items below.

Item 1 is a package, comprising:
  a tray having a recessed portion and a flange, the recessed portion defining a product-receiving cavity and the flange including two opposed edges defining a width of the tray; and
  a lidding film extending across the cavity;
  wherein the flange comprises a margin portion and a frame portion, the frame portion surrounding the cavity and the margin portion being disposed alongside the frame portion and extending substantially the width of the tray; and
  wherein the lidding film attaches to both the frame portion and the margin portion of the flange.

Item 2 is the package of item 1, wherein the margin portion frangibly connects to the frame portion.

Item 3 is the package of item 1, wherein the margin portion is separated from the frame portion and held in place alongside the frame portion by the lidding film.

Item 4 is the package of any of items 1-3, wherein the lidding film attaches to the frame portion along a closed path to seal the cavity.

Item 5 is the package of any of items 1-4, wherein attachment of the lidding film to the margin portion is characterized by a non-peelable seal, and attachment of the lidding film to at least part of the frame portion is characterized by a peelable seal.

Item 6 is the package of item 5, wherein the frame portion includes first and second end members that are connected to each other by first and second side members, the first end member being adjacent the margin portion, and wherein the at least part of the frame portion characterized by the peelable seal includes the first end member and the first and second side members.

Item 7 is the package of any of items 1-4, wherein the lidding film comprises a peelable/resealable film.

Item 8 is the package of item 7, wherein the peelable/resealable film is (a) resistant to delamination at attachment to the margin portion and (b) susceptible to delamination at attachment to the at least part of the frame portion.

Item 9 is the package of any of items 1-4, wherein the lidding film comprises a laminate that includes a first polymer film, a second polymer film, and an adhesive layer between the first and second polymer films, the laminate being configured to delaminate at the adhesive layer.

Item 10 is the package of item 9, wherein the adhesive layer includes an adhesive and is pattern-applied such that in patterned areas of the adhesive layer the first and second polymer films are separated by the adhesive and in unpatterned areas of the adhesive layer the first and second polymer films bond to each other without the adhesive therebetween.

Item 11 is the package of item 10, wherein the first and second polymer films are configured to delaminate from each other in the patterned areas.

Item 12 is the package of item 9, wherein the adhesive layer is unpatterned.

Item 13 is the package of any of items 1-12, wherein the tray comprises a thermoformed thermoplastic sheet.

Item 14 is the package of any of items 1-13, wherein the margin portion has a margin width, and wherein a ratio of the margin width to the width of the tray is in a range from 0.8 to 1.2.

Item 15 is the package of any of items 1-14, wherein attachment of the lidding film to the margin portion and to the frame portion is such that, as a user opens the package, the margin portion remains attached to the lidding film along the margin width to avoid transverse curling of the lidding film as the lidding film is separated from the frame portion.

Item 16 is the package of any of items 1-15, wherein the recessed portion includes a side wall having a first imperforate locking feature, and wherein the margin portion includes a second imperforate locking feature configured to mate with the first imperforate locking feature by pivotably rotating the margin portion towards the side wall.

Item 17 is the package of item 16, wherein the package is configured such that, when the first and second locking features are mated together, the margin portion functions as a base upon which the package can stand upright on a level surface.

Item 18 is the package of either of items 16 or 17, wherein the lidding film has a first film region covering the cavity and the frame portion of the flange and a second film region covering the margin portion of the flange, and wherein the lidding film has indicia printed thereon, the indicia including a first indicia image in the first film region and a different second indicia image in the second film region.

Item 19 is the package of item 18, wherein, when the first and second locking features are mated together, the lidding film is folded such that from a top view of the package the first indicia image is visible and from a side view of the package the second indicia image is visible.

Item 20 is the package of item 19, wherein from the top view of the package, the second indicia image is not substantially visible, and from the side view of the package, the first indicia image is not substantially visible.

Item 21 is the package of item 2, wherein the margin portion frangibly connects to the frame portion by a line of weakness, and wherein the tray is adapted to break along the line of weakness to separate the margin portion from the frame portion while the lidding film is adapted to bend along the line of weakness but remain intact and attached to both the margin portion and the frame portion.

Item 22 is a resealable package, comprising:
  a tray having a recessed portion and a flange, the recessed portion defining a product-receiving cavity and the flange including a frame portion and a margin portion, the frame portion surrounding the cavity, the frame portion including first and second end members and first and second side members that connect the first and second end members to each other, the margin portion being adjacent to and distinct from the first end member; and
  a lidding film attached to the first and second end members and to the first and second side members to seal the cavity, the lidding film also attached to the margin portion;
  wherein attachment of the lidding film to the margin portion is characterized by a non-peelable seal, and attachment of the lidding film to at least the first end member and the first and second side members is characterized by a peelable seal.

Item 23 is the package of item 22, wherein the lidding film comprises a peelable/resealable film, the peelable/resealable film being (a) resistant to delamination at attachment to the margin portion and (b) susceptible to delamination at attachment to the first end member, the first side member, and the second side member.

Item 24 is the package of either of items 22 or 23, wherein the lidding film comprises a laminate that includes a first polymer film, a second polymer film, and an adhesive layer between the first and second polymer films, the adhesive layer including an adhesive and being pattern-applied such that in patterned areas of the adhesive layer the first and second polymer films are separated by the adhesive and in unpatterned areas of the adhesive layer the first and second polymer films bond to each other without the adhesive therebetween.

Item 25 is the package of item 24, wherein the first and second polymer films are configured to delaminate from each other in the patterned areas of the adhesive layer.

Item 26 is the package of any of items 22-25, wherein attachment of the lidding film to the second end member is characterized by a non-peelable seal.

Item 27 is the package of any of items 22-26, wherein the flange includes two opposed edges defining a width of the tray, and wherein the margin portion extends substantially the width of the tray.

Item 28 is the package of any of items 22-27, wherein the recessed portion includes a side wall having a first imperforate locking feature, and wherein the margin portion includes a second imperforate locking feature configured to mate with the first imperforate locking feature by pivotably rotating the margin portion towards the side wall.

Item 29 is the package of item 28, wherein the package is configured such that, when the first and second locking features are mated together, the margin portion functions as a base upon which the package can stand upright on a level surface.

Item 30 is the package of either of items 28 or 29, wherein the lidding film has a first film region covering the cavity and the frame portion of the flange and a second film region covering the margin portion of the flange, and wherein the lidding film has indicia printed thereon, the indicia including a first indicia image in the first film region and a different second indicia image in the second film region.

Item 31 is the package of item 30, wherein, when the first and second locking features are mated together, the lidding film is folded such that from a top view of the package the first indicia image is visible and from a side view of the package the second indicia image is visible.

Item 32 is the package of item 31, wherein from the top view of the package, the second indicia image is not substantially visible, and from the side view of the package, the first indicia image is not substantially visible.

Item 33 is the package of any of items 22-32, wherein the margin portion frangibly connects to the first end member of the frame portion by a line of weakness, and wherein the tray is adapted to break along the line of weakness to separate the margin portion from the frame portion while the lidding film is adapted to bend along the line of weakness but remain intact and attached to the margin portion as well as to the first end member, the second end member, the first side member, and the second side member of the frame portion.

Item 34 is a thermoplastic sheet suitable for use as a component of a package to hold a product or products, the thermoplastic sheet being contoured to form a tray, the tray including a recessed portion and a flange, the recessed portion defining a product-receiving cavity and the flange including a frame portion and a margin portion, the frame portion surrounding the cavity and including first and second end members and first and second side members that connect the first and second end members to each other, the margin portion being disposed alongside the first end member with a line of transition therebetween;

wherein the recessed portion includes a side wall adjacent the first end member and having a first imperforate locking feature formed therein; and wherein the margin portion has a second imperforate locking feature formed therein, the second imperforate locking feature configured to mate with the first imperforate locking feature by pivotably rotating the margin portion about the line of transition towards the side wall.

Item 35 is the sheet of item 34, wherein the flange defines a width of the tray, and wherein the margin portion extends substantially the width of the tray.

Item 36 is the sheet of item 35, wherein the margin portion has a margin width, and wherein a ratio of the margin width to the width of the tray is in a range from 0.8 to 1.2.

Item 37 is the sheet of any of items 34-36, wherein the tray is configured such that, when the first and second locking features are mated together, the margin portion functions as a base upon which the tray can stand upright on a level surface.

Item 38 is the sheet of any of items 34-37, wherein the line of transition is a line of separation.

Item 39 is the sheet of any of items 34-37, wherein the line of transition is a line of weakness that frangibly connects the first end member to the margin portion.

Item 40 is the sheet of item 39, wherein the tray is adapted to break along the line of weakness to separate the margin portion from the first end member.

Item 41 is the sheet of any of items 34-40, wherein the tray is one of a plurality of trays formed in the sheet.

Item 42 is the sheet of item 41, wherein the plurality of trays are arranged in rows including a first and second row adjacent to each other, and wherein the trays in the first row are oriented in a first direction and the trays in the second row are oriented in a second direction opposite the first direction.

Item 43 is the sheet of either of items 41 or 42, wherein the plurality of trays are defined by longitudinal cut lines and transverse cut lines in the sheet, the longitudinal cut lines including a first longitudinal cut line and the transverse cut lines including a first transverse cut line and a second transverse cut line, the trays including a first and second adjacent tray that are each bounded by the first longitudinal cut line, the first transverse cut line, and the second transverse cut line, and wherein the line of transition for the first tray is not in registration with the line of transition for the second tray.

Item 44 is the sheet of item 43, wherein the first and second adjacent trays are oriented in opposed directions.

Item 45 is a package, comprising:
the sheet of any of items 34-44; and
a lidding film extending across the cavity and attached to both the frame portion and the margin portion of the flange.

Item 46 is the package of item 45, wherein the lidding film comprises a peelable film.

Item 47 is the package of either of items 45 or 46, wherein the lidding film comprises a peelable/resealable film.

Item 48 is the package of item 47, wherein the lidding film comprises a laminate that includes a first polymer film, a second polymer film, and an adhesive layer between the first and second polymer films, the laminate being configured to delaminate at the adhesive layer.

The invention claimed is:

1. A package, comprising:

a tray having a recessed portion and a flange, the recessed portion defining a product-receiving cavity and the flange including two opposed edges defining a width of the tray; and a lidding film extending across the cavity;

wherein the flange comprises a margin portion and a frame portion, the frame portion surrounding the cavity and the margin portion being disposed alongside the frame portion, wherein the margin portion has a margin width, and wherein a ratio of the margin width to the width of the tray is in a range of 0.8 to 1.2;

wherein the lidding film attaches to both the frame portion and the margin portion of the flange and the lidding film comprises a peelable/resealable film; and wherein the recessed portion includes a side wall having a first imperforate locking feature, and wherein the margin portion includes a second imperforate locking feature configured to mate with the first imperforate locking feature by pivotably rotating the margin portion towards the side wall.

2. The package of claim 1, wherein the margin portion frangibly connects to the frame portion.

3. The package of claim 1, wherein the margin portion is separated from the frame portion and held in place alongside the frame portion by the lidding film.

4. The package of claim 1, wherein attachment of the lidding film to the margin portion is characterized by a non-peelable seal, and attachment of the lidding film to at least part of the frame portion is characterized by a peelable seal.

5. The package of claim 4, wherein the frame portion includes first and second end members that are connected to each other by first and second side members, the first end member being adjacent to and distinct from the margin portion, and wherein the at least part of the frame portion characterized by the peelable seal includes the first end member and the first and second side members.

6. The package of claim 1, wherein the lidding film comprises a laminate that includes a first polymer film, a second polymer film, and an adhesive layer between the first and second polymer films, the laminate being configured to delaminate at the adhesive layer.

7. The package of claim 6, wherein the adhesive layer includes an adhesive and is pattern-applied such that in patterned areas of the adhesive layer the first and second polymer films are separated by the adhesive and in unpatterned areas of the adhesive layer the first and second polymer films bond to each other without the adhesive therebetween.

8. The package of claim 7, wherein the first and second polymer films are configured to delaminate from each other in the patterned areas.

9. The package of claim 6, wherein the adhesive layer is unpatterned.

10. The package of claim 1, wherein attachment of the lidding film to the margin portion and to the frame portion is such that, as a user opens the package, the margin portion remains attached to the lidding film along the margin width.

11. The package of claim 1, wherein the package is configured such that, when the first and second locking features are mated together, the margin portion functions as a base upon which the package can stand upright on a level surface.

12. The package of claim 2, wherein the margin portion frangibly connects to the frame portion by a line of weakness, and wherein the tray is adapted to break along the line of weakness to separate the margin portion from the frame portion while the lidding film is adapted to bend along the line of weakness but remain intact and attached to both the margin portion and the frame portion.

13. The package of claim 5, wherein attachment of the lidding film to the second end member is characterized by a non-peelable seal.

14. The package of claim 1, wherein the margin width is equal to the width of the tray.

15. The package of claim 3, wherein the margin portion is separated from the frame portion by a line of separation.

* * * * *